(12) United States Patent
Yan et al.

(10) Patent No.: US 12,513,582 B2
(45) Date of Patent: Dec. 30, 2025

(54) COMMUNICATION METHOD, DEVICE, AND APPARATUS

(71) Applicant: HUAWEI TECHNOLOGIES CO., LTD., Shenzhen (CN)

(72) Inventors: Le Yan, Shenzhen (CN); Tingting Geng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 526 days.

(21) Appl. No.: 18/174,117

(22) Filed: Feb. 24, 2023

(65) Prior Publication Data
US 2023/0217327 A1 Jul. 6, 2023

Related U.S. Application Data

(63) Continuation of application No. PCT/CN2020/110861, filed on Aug. 24, 2020.

(51) Int. Cl.
H04W 36/00 (2009.01)
H04W 48/20 (2009.01)
H04W 36/30 (2009.01)

(52) U.S. Cl.
CPC ....... *H04W 36/0079* (2018.08); *H04W 48/20* (2013.01); *H04W 36/0069* (2018.08); *H04W 36/305* (2018.08)

(58) Field of Classification Search
CPC . H04W 36/0079; H04W 48/20; H04W 76/19; H04W 36/0069; H04W 36/305
See application file for complete search history.

(56) References Cited

U.S. PATENT DOCUMENTS

2021/0168690 A1\* 6/2021 Zheng ................. H04W 36/305
2021/0195444 A1\* 6/2021 Teyeb ................... H04W 24/04

FOREIGN PATENT DOCUMENTS

EP 3681202 A1 \* 7/2020 ...... H04W 36/00837
WO WO-2019160281 A1 \* 8/2019 .......... H04W 36/362
(Continued)

OTHER PUBLICATIONS

Samsung, Remaining issues concerning conditional change (mostly PSCell). 3GPP TSG-RAN WG2#109e meeting, Online, Greece, Feb. 24-Mar. 4, 2020, R2-2001163, 23 pages.
(Continued)

*Primary Examiner* — Christopher M Brandt
*Assistant Examiner* — Quai'von V. Mallisham
(74) *Attorney, Agent, or Firm* — HAUPTMAN HAM, LLP

(57) ABSTRACT

A communication method, an apparatus, and a communications system. A terminal device receives first configuration information. In response to an RLF occurring in a source MCG or a source SCG of the terminal device, the terminal device sends a first message including information about a time period from the terminal device receiving the first configuration information to the radio link failure occurring in the source MCG or the source SCG, or information about a time period from the RLF occurring in the source MCG or the source SCG to the terminal device sending the first message. In this way, a network device exchanges proper and valid information between network devices based on the information reported by the terminal device, to optimize parameters.

20 Claims, 12 Drawing Sheets

(56) References Cited

FOREIGN PATENT DOCUMENTS

WO  WO-2020145736 A1 * 7/2020 .......... H04W 36/362
WO  WO-2020147050 A1 * 7/2020 ............ H04W 24/02

OTHER PUBLICATIONS

3GPP TS 38.331 V16.0.0 (Mar. 2020), 3rd Generation Partnership Project; Technical Specification Group Radio Access Network; NR; Radio Resource Control (RRC) protocol specification(Release 16), 835 pages.
Futurewei, Fast Pcell RLF recovery during intra-SN CPC. 3GPP TSG-RAN WG2 Meeting #109e, E-Conference, Feb. 24-Mar. 6, 2020, R2-2000447, 3 pages.
Chinese First Office Action issued in corresponding Chinese Application No. 202080103490.1, dated Mar. 18, 2025, pp. 1-13.

* cited by examiner

COMMUNICATION METHOD, DEVICE, AND APPARATUS

CROSS-REFERENCE TO RELATED APPLICATIONS

This application is a continuation of International Patent Application No. PCT/CN2020/110861, filed on Aug. 24, 2020. The disclosure of the aforementioned application is hereby incorporated by reference in its entirety.

BACKGROUND

In order to improve reliability of a secondary base station (secondary node, SN) change process, conditional primary secondary cell (primary secondary cell, PSCell) change (conditional PSCell change, CPC) is provided. In the CPC, a network device, for example, a network device to which a source primary cell belongs or a network device to which a source primary secondary cell belongs, may provide CPC configuration information corresponding to one or more candidate target PSCells for user equipment (user equipment, UE) via a radio resource control (radio resource control, RRC) reconfiguration message. After receiving the RRC reconfiguration message, the UE may determine whether the candidate PSCell meets an execution condition for primary secondary cell change, and use the PSCell that meets the execution condition for primary secondary cell change as a target PSCell.

However, in a foregoing CPC mechanism, change for a target PSCell may fail or succeed. In addition, a radio link failure may occur on a network device to which the source primary cell belongs or a network device to which the source primary secondary cell belongs. The network needs to minimize and avoid PSCell change failures and radio link failures in the CPC mechanism, to improve reliability of SN change.

SUMMARY

Embodiments described herein provide a communication method, a device, and an apparatus, to improve reliability of SN change.

According to a first aspect, at least one embodiment provides a communication method. The method is performed by a terminal device, or is performed by a chip having a function similar to that of a terminal device. In this method, the terminal device receives first configuration information. The first configuration information herein includes information about at least one candidate target primary secondary cell and corresponding information about an execution condition for primary secondary cell change. For example, the first configuration information includes information such as a physical cell identifier (Physical Cell Identifier, PCI), a cell global identifier (cell global identifier, CGI), or a frequency of the candidate target primary secondary cell. In response to a radio link failure (radio link failure, RLF) occurring in a source MCG or a source SCG of the terminal device, the terminal device sends a first message. The first message includes first time period information. The first time period information herein includes at least one of the following: information about a time period from in response to the terminal device receiving the first configuration information to in response to the radio link failure occurring in the source MCG or the source SCG, or information about a time period from in response to the RLF occurring in the source MCG or the source SCG to in response to the terminal device sending the first message.

Based on this solution, after the terminal device receives the first configuration information, in response to the RLF occurring in the source SCG or the source MCG, the terminal device records and reports the first time period information. In this way, a network device exchanges proper and valid information between network devices based on the information reported by the terminal device, to optimize parameters.

In at least one embodiment, in response to the RLF occurring in the source MCG or the source SCG, and the terminal device determines, based on the first configuration information, that the first cell does not exist or cannot determine the first cell, the terminal device sends the first message.

Based on this solution, in response to the RLF occurring in the source MCG or the source SCG, and the first cell does not exist in the at least one candidate target primary secondary cell, the terminal device sends the first message. In this way, the network device exchanges proper and valid information between network devices based on the information reported by the terminal device, to optimize parameters.

In at least one embodiment, after the RLF occurring in the source SCG, the terminal device determines the first cell based on the first configuration information, and initiates access to the first cell. In response to the terminal device successfully accessing the first cell, the first time period information further includes at least one of the following: information about a time period from in response to the RLF occurring in the source SCG to in response to the terminal device determining the first cell, information about a time period from in response to the terminal device determining the first cell to in response to the terminal device successfully accessing the first cell, or information about a time period from in response to the terminal device successfully accessing the first cell to in response to the terminal device sending the first message. In response to the terminal device failing to access the first cell, and no RLF occurring in the source MCG, the first time period information further includes at least one of the following: information about a time period from in response to the RLF occurring in the source SCG to in response to the terminal device determining the first cell, information about a time period from in response to the terminal device determining the first cell to in response to the terminal device failing to access the first cell, or information about a time period from in response to the terminal device failing to access the first cell to in response to the terminal device sending the first message. In response to the terminal device failing to access the first cell, and the RLF occurring in the source MCG, the first time period information further includes at least one of the following: information about a time period from in response to the RLF occurring in the source SCG to in response to the terminal device determining the first cell, information about a time period from in response to the terminal device determining the first cell to in response to the RLF occurring in the source MCG, information about a time period from in response to the RLF occurring in the source MCG to in response to the terminal device failing to access the first cell, or information about a time period from in response to the terminal device failing to access the first cell to in response to the terminal device sending the first message. Alternatively, in response to the terminal device failing to access the first cell, and the RLF occurring in the source MCG, the first time period information further includes at least one of the following: information about a time period from in response to the RLF occurring in the source SCG to in response to the terminal device determining the first cell, information about a time period from in response to the terminal device determining the first cell to in response to the terminal device failing to access the first cell, information about a time period from in response to the terminal device failing to access the first cell to in response to the RLF occurring in the source MCG, or information about a time period from in response to the RLF occurring in the source MCG to in response to the terminal device sending the first message.

Based on this solution, after the RLF occurs in the source SCG, the terminal device further determines the first cell based on the first configuration information, and initiate access to the first cell. The terminal device sends different information after successfully accessing the first cell, in response to failing to access the first cell and no RLF occurring in the source MCG, in response to failing to access the first cell and the RLF occurring in the source MCG, or the like, so that the network device optimizes parameters based on the information reported by the terminal device.

In at least one embodiment, before the RLF occurs in the source MCG or the source SCG, in response to the terminal device determining the first cell, the first time period information further includes at least one of the following: information about a time period from in response to the terminal device receiving the first configuration information to in response to the terminal device determining the first cell; or information about a time period from in response to the terminal device determining the first cell to in response to the RLF occurring in the source MCG or the source SCG.

Based on this solution, before the RLF occurs in the source MCG or the source SCG, in response to the terminal device determining the first cell, the terminal device reports the information about the time period from in response to the first configuration information being received to in response to the first cell being determined and/or the information about the time period from in response to the first cell being determined to in response to the RLF occurring in the source MCG or the source SCG, so that the network device performs parameter optimization based on the information reported by the terminal device.

In at least one embodiment, before the RLF occurs in the source MCG or the source SCG, in response to the terminal device determining the first cell, and the terminal device successfully accesses the first cell, the first time period information further includes at least one of the following: information about a time period from in response to the RLF occurring in the source MCG or the source SCG to in response to the terminal device accessing the first cell, or information about a time period from in response to the terminal device accessing the first cell to in response to the terminal device sending the first message.

Based on this solution, before the RLF occurs in the source MCG or the source SCG, in response to the terminal device determining the first cell, and the terminal device successfully accesses the first cell, the terminal device reports the information about the time period from in response to the RLF occurring in the source MCG or the source SCG to in response to the terminal device accessing the first cell and/or the information about the time period from in response to the terminal device accessing the first cell to in response to the terminal device sending the first message, so that the network device performs parameter optimization based on the information reported by the terminal device.

In at least one embodiment, before the RLF occurs in the source MCG, in response to the terminal device determining the first cell, the terminal device fails to access the first cell, and no RLF occurring in the source SCG, the first time period information further includes at least one of the following: information about a time period from in response to the RLF occurring in the source MCG to in response to the terminal device failing to access the first cell, or information about a time period from in response to the terminal device failing to access the first cell to in response to the terminal device sending the first message. In response to the terminal device failing to access the first cell, and the RLF occurring in the source SCG, the first time period information further includes at least one of the following: information about a time period from in response to the RLF occurring in the source MCG to in response to the RLF occurring in the source SCG, information about a time period from in response to the RLF occurring in the source SCG to in response to the terminal device failing to access the first cell, or information about a time period from in response to the terminal device failing to access the first cell to in response to the terminal device sending the first message. Alternatively, in response to the terminal device failing to access the first cell, and the RLF occurring in the source SCG, the first time period information includes at least one of the following: information about a time period from in response to the RLF occurring in the source MCG to in response to the terminal device failing to access the first cell, information about a time period from in response to the terminal device failing to access the first cell to in response to the RLF occurring in the source SCG, or information about a time period from in response to the RLF occurring in the source SCG to in response to the terminal device sending the first message.

Based on this solution, before the RLF occurs in the source MCG, in response to the terminal device determining the first cell, the terminal device reports different information in different cases, for example, in response to the terminal device failing to access the first cell and no RLF occurring in the source SCG, or in response to the terminal device failing to access the first cell and the RLF occurring in the source SCG, so that the network device optimizes parameters based on the reported information.

In at least one embodiment, before the RLF occurs in the source SCG, in response to the terminal device determining the first cell, the terminal device fails to access the first cell, and no RLF occurring in the source MCG, the first time period information further includes at least one of the following: information about a time period from in response to the RLF occurring in the source SCG to in response to the terminal device failing to access the first cell, or information about a time period from in response to the terminal device failing to access the first cell to in response to the terminal device sending the first message. Alternatively, in response to the terminal device failing to access the first cell, and the RLF occurring in the source MCG, the first time period information further includes at least one of the following: information about a time period from in response to the RLF occurring in the source SCG to in response to the RLF occurring in the source MCG, information about a time period from in response to the RLF occurring in the source MCG to in response to the terminal device failing to access the first cell, or information about a time period from in response to the terminal device failing to access the first cell to in response to the terminal device sending the first message. Alternatively, in response to the terminal device failing to access the first cell, and the RLF occurring in the source MCG, the first time period information further includes at least one of the following: information about a time period from in response to the RLF occurring in the source SCG to in response to the terminal device failing to access the first cell, information about a time period from in response to the terminal device failing to access the first cell to in response to the RLF occurring in the source MCG, or information about a time period from in response to the RLF occurring in the source MCG to in response to the terminal device sending the first message.

Based on this solution, before the RLF occurs in the source SCG, in response to the terminal device determining the first cell, the terminal device reports different information in different cases, for example, in response to the terminal device failing to access the first cell and no RLF occurring in the source MCG, or in response to the terminal device failing to access the first cell and the RLF occurring in the source MCG, so that the network device optimizes parameters based on the information reported by the terminal device.

In at least one embodiment, after the terminal device successfully accesses the first cell, in response to the RLF occurring in the source MCG or the source SCG, the first time period information further includes at least one of the following: information about a time period from in response to the terminal device receiving the first configuration information to in response to the terminal device determining the first cell, information about a time period from in response to the terminal device determines the first cell to in response to the terminal device successfully accessing the first cell, or information about a time period from in response to the terminal device successfully accessing the first cell to in response to the RLF occurring in the source MCG or the source SCG.

Based on this solution, after successfully accessing the first cell, the terminal device reports the first message. In this way, terminal devices exchange proper and valid information, so that the network device optimizes parameters.

In at least one embodiment, the terminal device further sends first indication information. The first indication information indicates that the RLF occurs in the source MCG or the RLF occurs in the source SCG.

Based on this solution, the terminal device indicates, to a network device via the first indication information, that the RLF occurs in the source SCG or the RLF occurs in the source MCG, so that the network device optimizes parameters.

In at least one embodiment, the first message further includes: cell information of the source primary cell, cell information of the source primary secondary cell, cell information of the at least one candidate target primary secondary cell, indication information indicating that the terminal device receives the first configuration information, indication information indicating that the terminal device determines the first cell or fails to determine the first cell, or indication information indicating that the terminal device successfully accesses the first cell or fails to access the first cell.

Based on this solution, the terminal device further reports the cell information of the source primary cell, the cell information of the source primary secondary cell, or the cell information of the at least one candidate target primary secondary cell to the network device, so that the network device knows the cell information, and optimize a mobility parameter corresponding to a corresponding cell.

In at least one embodiment, the terminal device further sends second indication information. The terminal device further receives a request message in response to the second indication information. The request message requests the terminal device to send the first message. The terminal device sends the first message based on the request message.

Based on this solution, the terminal device records the first message, and report the first message in response to the network device requesting the first message.

According to a second aspect, a communication method is provided. The method is performed by a network device, or is performed by a chip having a function similar to that of a network device. In this method, a first network device receives a first message sent by a terminal device. The first message includes first time period information of the terminal device. The first time period information includes at least one of the following: information about a time period from in response to the terminal device receiving first configuration information to in response to a radio link failure occurring in a source MCG or a source SCG, or information about a time period from in response to the RLF occurring in the source MCG or the source SCG to in response to the terminal device sending the first message. The first network device sends a second message to a second network device. The second message includes a part or all of the first message. The first network device is a network device that manages a source primary cell, and the second network device is a network device that manages a source primary secondary cell; the first network device is a network device that manages a source primary cell, and the second network device is a network device that manages at least one candidate target primary secondary cell; the first network device is a network device that manages a source primary secondary cell, and the second network device is a network device that manages a source primary cell; the first network device is a network device that manages a source primary secondary cell, and the second network device is a network device that manages at least one candidate target primary secondary cell; the first network device is a network device that provides communication for the terminal device, and the second network device is a network device that manages a source primary cell; the first network device is a network device that provides communication for the terminal device, and the second network device is a network device that manages a source primary secondary cell; or the first network device is a network device that provides communication for the terminal device, and the second network device is a network device that manages at least one candidate target primary secondary cell. The at least one candidate target primary secondary cell is configured for the terminal device by a network device that manages a source primary cell of the terminal device.

Based on this solution, network devices exchange a part or all of the first message to optimize a mobility parameter, for example, optimize a CPC-related parameter (where for example, a parameter corresponding to a candidate target primary secondary cell included in the first configuration information is optimized, and specifically, information about the candidate target primary secondary cell is changed, and/or information about an execution condition for primary secondary cell change is changed; or the candidate target primary secondary cell included in the first configuration information is deleted, and/or another cell is added as a candidate target primary secondary cell), to improve reliability of SN change of the terminal device.

In at least one embodiment, the second message further includes first information indicating delayed CPC. The delayed CPC herein means that a time at which the network device sends the first configuration information to the terminal device is delayed.

Based on this solution, the network device determines, based on the second message, that the delayed CPC occurs, so as to optimize the mobility parameter and improve the reliability of the SN change of the terminal device.

In at least one embodiment, the first network device determines, based on the first time period information, that the RLF occurs in the source SCG or the source MCG. The first network device releases the source SCG and/or the source MCG; the first network device changes an SCG and/or an MCG; or the first network device keeps the source SCG and/or the source MCG unchanged. The first network device is the network device that manages the source primary cell.

Based on this solution, the first network device further determines, based on the information reported by the terminal device, that the RLF occurs in the source SCG or the source MCG. Therefore, the first network device releases the source SCG or the source MCG, change the SCG or the MCG, or keeps the source SCG or the source MCG unchanged, so as to improve system reliability.

In at least one embodiment, the first network device further receives second indication information sent by the terminal device. The first network device sends a request message to the terminal device in response to the second indication information. The request message requests the first message. The first network device receives the first message sent by the terminal device.

Based on this solution, the first network device determines, based on the second indication information, that the terminal device has recorded the first message, and requests the terminal device to report the first message.

According to a third aspect, at least one embodiment further provides a communication method. The method is performed by a second network device, or is performed by a chip having a function similar to that of a second network device. In this method, the second network device receives a second message sent by a first network device. The second message includes first time period information of a terminal device. The first time period information herein includes at least one of the following: information about a time period from in response to the terminal device receiving the first configuration information to in response to the radio link failure occurring in the source MCG or the source SCG, or information about a time period from in response to the RLF occurring in the source MCG or the source SCG to in response to the terminal device sending the first message. The second network device further sends a third message to a third network device. The third message includes a part or all of the second message. The first network device is a network device that provides communication for the terminal device, the second network device is a network device that manages at least one candidate target primary secondary cell, and the third network device is a network device that manages a source primary cell or a network device that manages a source primary secondary cell.

Based on this solution, network devices exchange a part or all of the second message to optimize a mobility parameter, for example, optimize a CPC-related parameter (where for example, a parameter corresponding to a candidate target primary secondary cell included in the first configuration information is optimized, and specifically, information about the candidate target primary secondary cell is changed, and/or information about an execution condition for primary secondary cell change is changed; or the candidate target primary secondary cell included in the first configuration information is deleted, and/or another cell is added as a candidate target primary secondary cell), to improve reliability of SN change of the terminal device.

In at least one embodiment, the third message includes first information indicating delayed CPC.

Based on this solution, the network device determines, based on the third message, that the delayed CPC occurs, so as to optimize the mobility parameter and improve the reliability of the SN change of the terminal device.

According to a fourth aspect, a communication apparatus is provided. The communication apparatus includes modules/units configured to perform the first aspect, includes modules/units configured to perform the second aspect, or includes modules/units configured to perform the third aspect. The communication apparatus is a terminal or a chip used for a terminal.

According to a fifth aspect, a communication apparatus is provided. The communication apparatus includes a processor and a memory. The memory is configured to store computer-executable instructions. In response to a controller running, the processor executes the computer-executable instructions in the memory to perform, by using a hardware resource in the controller, the operation steps of the method in the first aspect, the operation steps of the method in the second aspect, or the operation steps of the method in the third aspect. The communication apparatus is a network device or a chip used for a network device. The network device is a base station.

According to a sixth aspect, embodiments described herein includes a computer-readable storage medium. The computer-readable storage medium stores instructions, and in response to the instructions being run on a computer, the computer is enabled to perform the methods in the foregoing aspects.

According to a seventh aspect, at least one embodiment provides a computer program product storing instructions. In response to the computer program product being run on a computer, the computer is enabled to perform the methods in the foregoing aspects.

In addition, beneficial effects of the fourth aspect to the seventh aspect is beneficial effects shown in the first aspect and the second aspect.

DESCRIPTION OF EMBODIMENTS

Figure 1:
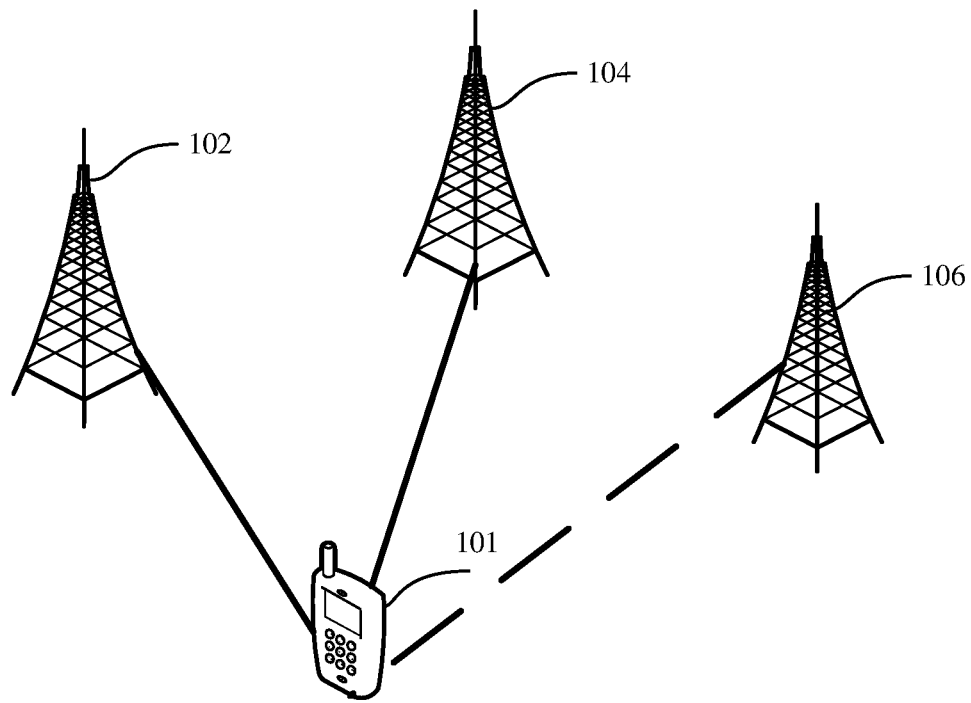
FIG. 1 shows a communication system according to at least one embodiment.

The following describes some terms in embodiments to facilitate understanding of a person skilled in the art.

(1) A cell is an area covered by a network device or a part of a network device in a mobile communication system. The network device herein is referred to as a network device that manages a cell.

(2) Delayed conditional primary secondary cell change (conditional PSCell change, CPC) means that a network device sends a message late, and consequently the terminal device cannot perform primary secondary cell change, where the message is used for a CPC process. For example, time is late in response to a network device (referred to as a source primary network device) to which a source primary cell belongs or a network device (referred to as a source secondary network device) to which a source primary secondary cell belongs sending the first configuration information to a terminal device. As a result, before the terminal device receives the first configuration information, before the terminal device determines a first cell, or before the terminal device successfully accesses the first cell, an RLF occurs in a source MCG (or the source primary network device) or a source SCG (or the source secondary network device).

(3) Terms "system" and "network" is used interchangeably in at least one embodiment. The term "a plurality of" means two or more, and another quantifier is similar to this. The term "and/or" describes an association relationship for describing associated objects and represents that three relationships exist. For example, A and/or B represent the following three cases: Only A exists, both A and B exist, and only B exists. In addition, an element (element) that appears in singular forms "a", "an", and "the" does not mean "one or only one" unless otherwise specified in the context, but means "one or more". For example, "a device" means one or more such devices. Further, "at least one (at least one of) . . ." means one or any combination of subsequent associated objects. For example, "at least one of A, B, and C" includes A, B, C, AB, AC, BC, or ABC.

Technical solutions in at least one embodiment is applied to various communication systems, for example, a long term evolution (long term evolution, LTE) system, a worldwide interoperability for microwave access (worldwide interoperability for microwave access, WiMAX) communication system, a future 5th generation (5th Generation, 5G) system such as a new radio access technology (new radio access technology, NR), and a future communication system such as a 6G system.

All aspects, embodiments, or features are presented herein by describing a system that includes a plurality of devices, components, modules, and the like. It should be appreciated and understood that, each system includes another device, component, module, and the like, and/or does not include all devices, components, modules, and the like discussed with reference to the accompanying drawings. In addition, a combination of these solutions is used.

The network architecture and the service scenario described in at least one embodiment are intended to describe the technical solutions in at least one embodiment more clearly, and do not constitute any limitation on the technical solutions provided in at least one embodiment. A person of ordinary skill in the art knows that: With the evolution of the network architecture and the emergence of new service scenarios, the technical solutions provided in at least one embodiment are also applicable to similar technical problems.

Embodiments described herein are used in a conventional typical network or a future UE-centric (UE-centric) network. A non-cell (Non-cell) network architecture is introduced to the UE-centric network. To be specific, a large quantity of small cells are deployed in a specific area to form a hyper cell (Hyper cell). Each small cell is a transmission point (Transmission Point, TP) or a transmission reception point (Transmission and Reception Point, TRP) of the hyper cell, and is connected to a centralized controller (controller). In response to the UE moving in the hyper cell, a network side device selects a new sub-cluster (sub-cluster) for the UE in real time to serve the UE, to avoid real cell handover, and implement UE service continuity. The network side device includes a wireless network device. Alternatively, in the UE-centric network, a plurality of network side devices such as small cells have independent controllers such as distributed controllers. Each small cell independently schedules a user, and information is exchanged between small cells for a long time, so that the small cell provides a coordinated service for the UE flexibly to some extent.

In embodiments described herein, different base stations are base stations having different identifiers, or are base stations that have a same identifier and that are deployed at different geographical locations. Before a base station is deployed, the base station does not know whether the base station is involved in the scenario to which embodiments described herein are applied. Therefore, the base station or a baseband chip should support, before deployment, a method provided in at least one embodiment. The foregoing base stations having the different identifiers are base station identifiers, or are cell identifiers or other identifiers.

In at least one embodiment, an NR network scenario in a wireless communication network is used as an example to describe some scenarios. In at least one embodiment applied to another wireless communication network, and a corresponding name is also replaced with a name of a corresponding function in the another wireless communication network.

The technical solutions provided in at least one embodiment is applied to wireless communication between communication devices. The wireless communication between communication devices includes wireless communication between a network device and a terminal device, wireless communication between network devices, and wireless communication between terminal devices. In at least one embodiment, the term "wireless communication" is referred to as "communication" for short, and the term "communication" is also described as "data transmission", "information transmission", or "transmission".

For ease of understanding embodiments described herein, a communication system shown in FIG. 1 is first used as an example to describe in detail a communication system applicable to embodiments described herein. FIG. 1 is a schematic diagram of a communication system applicable to a communication method according to at least one embodiment. As shown in FIG. 1, the communication system 100 includes a first network device 102, a second network device 104, a third network device 106, and a terminal device 101. The first network device 102, the second network device 104, and the third network device 106 is configured with a plurality of antennas, and the terminal device is also configured with a plurality of antennas. Optionally, the communication system further includes a terminal device 103 (not shown in the figure).

In the communication system 100, the first network device 102 is a network device that manages a source MCG of the terminal device 101, the second network device 104 is a network device that manages a source SCG of the terminal device, and the third network device 106 is a network device that manages one of candidate target primary secondary cells. The first network device 102 or the second network device 104 configures a target primary secondary cell for the terminal device 101 by using the first configuration information. The first configuration information includes information about at least one candidate target primary secondary cell and corresponding information about an execution condition for primary secondary cell change. The terminal device 101 determines, based on the first configuration information, a first cell that meets the execution condition for primary secondary cell change. The first cell belongs to the third network device 106. The terminal device initiates access to the third network device 106.

The terminal device 101 successfully accesses the third network device 106, or fails to access the third network device 106. In response to the terminal device failing to access the third network device 106, and an RLF occurs in the source SCG or the source MCG, the terminal device reports a first message to the first network device 102, the second network device 104, or the third network device 106. The first network device 102, the second network device 104, and the third network device 106 exchange proper and valid information to perform parameter optimization, so as to improve reliability of SN change of the terminal device 101.

A terminal device in at least one embodiment includes a device that provides voice and/or data connectivity for users. Specifically, the terminal device includes a device that provides voice for users, includes a device that provides data connectivity for users, or includes a device that provides voice and data connectivity for users. For example, the terminal device includes a handheld device having a wireless connection function or a processing device connected to a wireless modem. The terminal communicates with a core network through a radio access network (radio access network, RAN), and exchange a voice or data with the RAN, or exchange a voice and data with the RAN. The terminal includes user equipment (user equipment, UE), a wireless terminal, a mobile terminal, a device-to-device communication (device-to-device, D2D) terminal, a vehicle-to-everything (vehicle to everything, V2X) terminal, a machine-to-machine/machine type communication (machine-to-machine/machine-type communications, M2M/MTC) terminal, an internet of things (internet of things, IoT) terminal, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal includes a mobile phone (or referred to as a "cellular" phone), a computer with a mobile terminal, or a portable, pocket-sized, handheld, or computer built-in mobile apparatus. For example, it is a device such as a personal communications service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device alternatively includes a limited device, for example, a device with relatively low power consumption, a device with a limited storage capability, or a device with a limited computing capability. For example, the terminal device includes an information sensing device such as a bar code, a radio frequency identification (radio frequency identification, RFID) apparatus, a sensor, a global positioning system (global positioning system, GPS), or a laser scanner.

By way of example and not limitation, in at least one embodiment, the terminal is alternatively a wearable device. The wearable device is also referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that implements all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

In response to the various terminals described above being located on a vehicle (for example, placed in the vehicle or installed in the vehicle), the terminals is considered as vehicle-mounted terminals. For example, the vehicle-mounted terminal is also referred to as an on board unit (on-board unit, OBU).

In at least one embodiment, an apparatus configured to implement a function of a terminal is a terminal, or is an apparatus, for example, a chip system, that supports the terminal in implementing the function. The apparatus is installed in the terminal. In at least one embodiment, the chip system includes a chip, or includes a chip and another discrete component. In the technical solutions provided in at least one embodiment, the technical solutions provided in at least one embodiment are described by using an example in which the apparatus configured to implement the function of the terminal is the terminal.

A network device in at least one embodiment includes, for example, an access network (access network, AN) device such as a base station (for example, an access point), and is a device that communicates with a wireless terminal over an air interface through one or more cells in an access network. Alternatively, the network device in at least one embodiment is, for example, a network device such as a road side unit (road side unit, RSU) in a vehicle-to-everything (vehicle-to-everything, V2X) technology. The base station is configured to mutually convert a received over-the-air frame and an IP packet, and serve as a router between the terminal and a remaining part of the access network. The remaining part of the access network includes an IP network. The RSU is a fixed infrastructure entity supporting a V2X application, and exchanges a message with another entity supporting the V2X application. The network device further coordinates attribute management of the air interface. For example, the network device includes an evolved NodeB (NodeB, eNB, or e-NodeB, evolved NodeB) in a long term evolution (long term evolution, LTE) system or a long term evolution-advanced (long term evolution-advanced, LTE-A) system. Alternatively, the network device includes a next generation NodeB (next generation NodeB, gNB) in an evolved packet core (evolved packet core, EPC) network, a fifth generation mobile communication technology (the 5th generation, 5G), or a new radio (new radio, NR) system. Alternatively, the network device includes a central unit (centralized unit, CU) and a distributed unit (distributed unit, DU) in a cloud access network (cloud radio access network, Cloud RAN) system. This is not limited in at least one embodiment.

The network device further includes a core network device, and the core network device includes, for example, an access and mobility management function (access and mobility management function, AMF).

In at least one embodiment, an apparatus configured to implement a function of the network device is a network device, or is an apparatus, for example, a chip system, that supports the network device in implementing the function. The apparatus is installed in the network device. In the technical solutions provided in at least one embodiment, the technical solutions provided in at least one embodiment are described by using an example in which the apparatus configured to implement the function of the network device is the network device.

The technical solutions are applied to a multiple-radio dual connectivity (multiple radio dual connectivity, MR-DC) communication system. DC means that two base stations are supported to simultaneously provide a data transmission service for one terminal device. A base station in which a PCell is located is referred to as a master base station, and a base station in which a primary secondary cell (primary secondary cell, PSCell) is located is referred to as a secondary base station. The MR-DC includes EN-DC, NE-DC, NGEN-DC, and other architectures. The EN-DC herein is an architecture in which an LTE base station is used as a primary base station, an NR base station is used as a secondary base station to perform dual connectivity, and both the primary base station and the secondary base station are connected to a 4G core network (evolved packet core, EPC). The NE-DC is an architecture in which an NR base station is used as a master base station, an LTE base station is used as a secondary base station to perform dual connectivity, and both the master base station and the secondary base station are connected to a 5G core network. The NGEN-DC is an architecture in which an LTE base station is used as a master base station, an NR base station is used as a secondary base station to perform dual connectivity, and both the master base station and the secondary base station are connected to a 5G core network, which is different from that of the EN-DC. A network device in the communication system corresponds to the first network device 102, the second network device 104, or the third network device 106 shown in FIG. 1, and a terminal device is corresponding to the terminal device 101 shown in FIG. 1. The terminal device 101 is connected to the first network device 102 and the second network device 104. The first network device 102 is the master base station, and the second network device 104 is the secondary base station. A plurality of serving cells in the first network device 102 form a master cell group (master cell group, MCG), and a plurality of serving cells in the second network device 104 form a secondary cell group (secondary cell group, SCG).

Without loss of generality, the following describes embodiments described herein in detail by using an interaction process between a terminal device and a network device as an example. The terminal device is a terminal device that is in a wireless communication system and that has a wireless connection relationship with the network device. The network device communicates with a plurality of terminal devices that have a wireless connection relationship with the network device in the wireless communication system based on a same technical solution. This is not limited in at least one embodiment.

Figure 2:
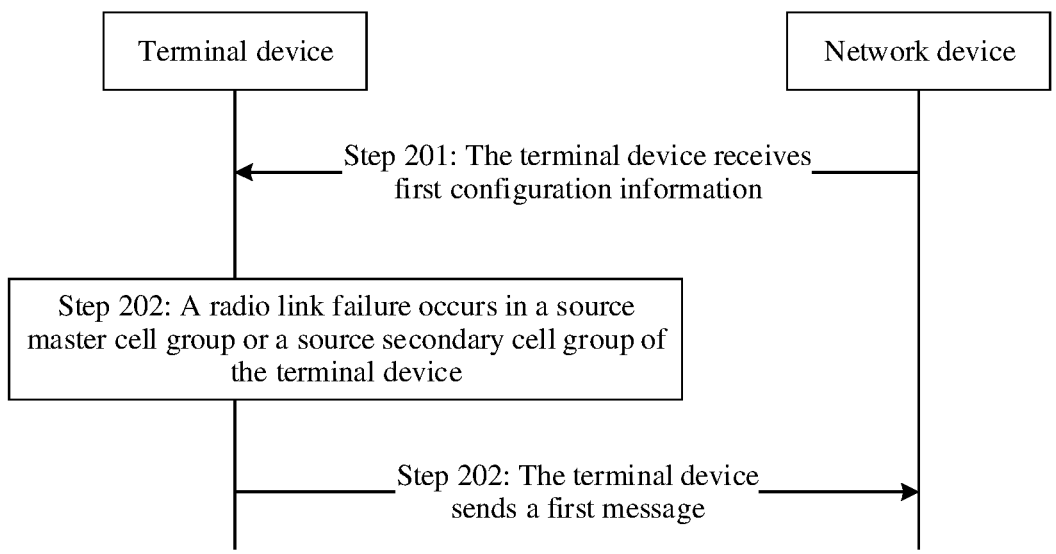
FIG. 2 is one of example flowcharts of a communication method according to at least one embodiment.

FIG. 2 is an example flowchart of a communication method from the perspective of device interaction according to at least one embodiment. As shown in FIG. 2, the method includes the following steps.

Step 201: A terminal device receives first configuration information.

The terminal device receives the first configuration information from a network device. In response to primary secondary cell change being initiated by a primary base station, the terminal device receives the first configuration information from a source primary base station. In response to the primary secondary cell change being initiated by a secondary base station, the terminal device receives the first configuration information from a source secondary base station. The first configuration information herein includes information about at least one candidate target primary secondary cell and corresponding information about an execution condition for primary secondary cell change. The first configuration information is used to determine a first cell. It should be understood that the first cell is a cell that is in the at least one candidate target primary secondary cell and that meets the execution condition for primary secondary cell change. The terminal device also determines, based on the first configuration information, whether the cell that is in the at least one candidate target primary secondary cell and that meets the execution condition for primary secondary cell change exists, that is, determine whether the first cell exists. The following explains and describes the information about the at least one candidate target primary secondary cell and the corresponding information about the execution condition for primary secondary cell change.

1. Information about a candidate target primary secondary cell includes identification information of each candidate target primary secondary cell. For example, the identification information is a measurement identifier (measurement identifier, measID), a configuration identifier (for example, condReconfigId), a physical cell identifier (physical cell identifier, PCI), or a cell global identifier (Cell Global Identity, CGI). The information about the candidate target primary secondary cell further includes a cell index (for example, a cell index) of each candidate target primary secondary cell, a cell-radio network temporary identifier (cell-radio network temporary identifier, C-RNTI) allocated by each candidate target primary secondary cell to the terminal device, a random access channel (random access channel, RACH) resource used for accessing the candidate target primary secondary cell, frequency information of each candidate target primary secondary cell, or at least one of a physical layer configuration parameter, a media access control (media access control, MAC) layer configuration parameter, a radio link control (radio link control, RLC) layer configuration parameter, a packet data convergence protocol (packet data convergence protocol, PDCP) layer configuration parameter, a service data adaptation protocol (service data adaption protocol, SDAP) layer configuration parameter, a radio resource control (radio resource control, RRC) layer configuration parameter, or the like of each candidate target primary secondary cell.

2. The execution condition for primary secondary cell change includes an execution event type for primary secondary cell change and a corresponding threshold. The event type for primary secondary cell change includes an event A3, an event A5, or another execution event type. Each candidate target primary secondary cell corresponds to one or more execution conditions for primary secondary cell change. For example, one candidate target primary secondary cell is configured with one execution event type, and is configured with at least one threshold and/or a maximum of two different trigger qualities (trigger qualities). The trigger quality includes reference signal received power (reference signal received power, RSRP), reference signal received quality (reference signal received quality, RSRQ), or signal to interference plus noise ratio (signal to interference plus noise ratio, SINR). The terminal device determines, based on the first configuration information, whether the candidate target primary secondary cell meets the execution condition for primary secondary cell change.

For example, an execution event type for primary secondary cell change configured by the network device for a candidate target primary secondary cell A is the A3 event, and a configured corresponding threshold is a first threshold. In this case, in response to cell signal quality of the candidate target primary secondary cell A being higher than cell signal quality of a source primary secondary cell by the first threshold, the terminal device considers that the candidate target primary secondary cell A meets the condition for primary secondary cell change. In other words, the terminal device determines the candidate target primary secondary cell A as the first cell. The cell signal quality includes at least one of RSRP, RSRQ, or an SINR.

Step 202: The terminal device sends a first message in response to a radio link failure occurring in a source master cell group MCG or a source secondary cell group SCG of the terminal device.

The terminal device sends the first message to the network device. The network device herein is the source primary base station (a source primary network device), a source secondary base station (a source secondary network device), a base station that manages the first cell, or a base station that currently provides a communication service for the terminal device. Optionally, in an implementation, the terminal device sends second indication information to the network device after recording the first message. The second indication information is used to notify the network device that the terminal device has recorded the first message, or is used to trigger the network device to send a request message. The request message is used to request the first message. The first network device sends the request message to the terminal device after receiving the second indication information. Then, the terminal device sends the first message to the network device based on the request message.

The first message herein includes first time period information. The first time period information is at least one of the following: information about a time period T1 from in response to the terminal device receiving the first configuration information to in response to the RLF occurring in the source MCG or the source SCG, or information about a time period T2 from in response to the RLF occurring in the source MCG or the source SCG to in response to the terminal device sending the first message.

In the solution of at least one embodiment, that the RLF occurs in the source MCG means that the RLF occurs in a source PCell and/or at least one Scell that belongs to the source primary network device, and that the RLF occurs in the source SCG means that the RLF occurs in a source PSCell and/or at least one Scell that belongs to the source secondary network device.

Figure 3:
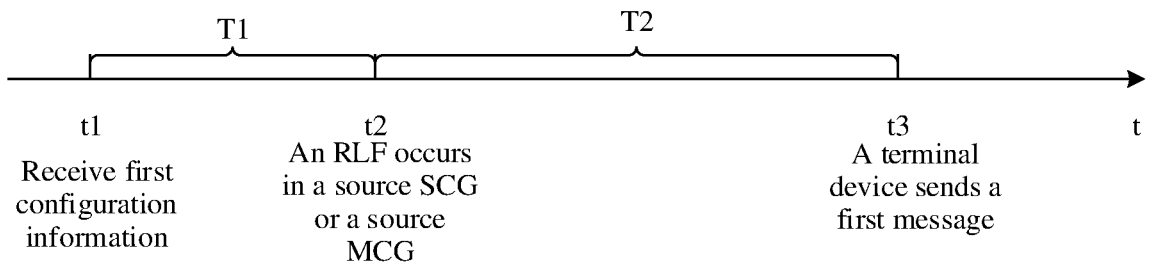
FIG. 3 is one of schematic diagrams of first time period information according to at least one embodiment.

As shown in FIG. 3, the terminal device receives the first configuration information at a moment t1. The RLF occurs in the source MCG or the source SCG at a moment t2. The terminal device sends the first message at a moment t3. Therefore, the first message includes T1, T2, or T1 and T2. It should be understood that a length of a line segment in the figure in at least one embodiment does not indicate a length of a time period. For example, in FIG. 3, although a line segment indicating T2 is longer than a line segment indicating T1, this does not indicate that T2 is longer than T1. The time period information in the figure is merely an example.

In addition, different specific moments at which the RLF occurs in the source MCG or the source SCG causes different first time period information. The following describes the first time period information based on time at which the RLF occurs in the source MCG or the source SCG.

Example 1: In Response to the RLF Occurring in the Source MCG or the Source SCG, the First Cell does not Exist That the first cell does not exist is that the first cell does not exist in response to the RLF occurring in the source MCG or the source SCG, or that before the RLF occurs in the source MCG or the source SCG, the terminal device fails to determine the first cell based on the first configuration information. In this scenario, the terminal device sends the first time period information shown in FIG. 3. For example, the first time period information includes T1, T2, or T1 and T2.

Figure 4:
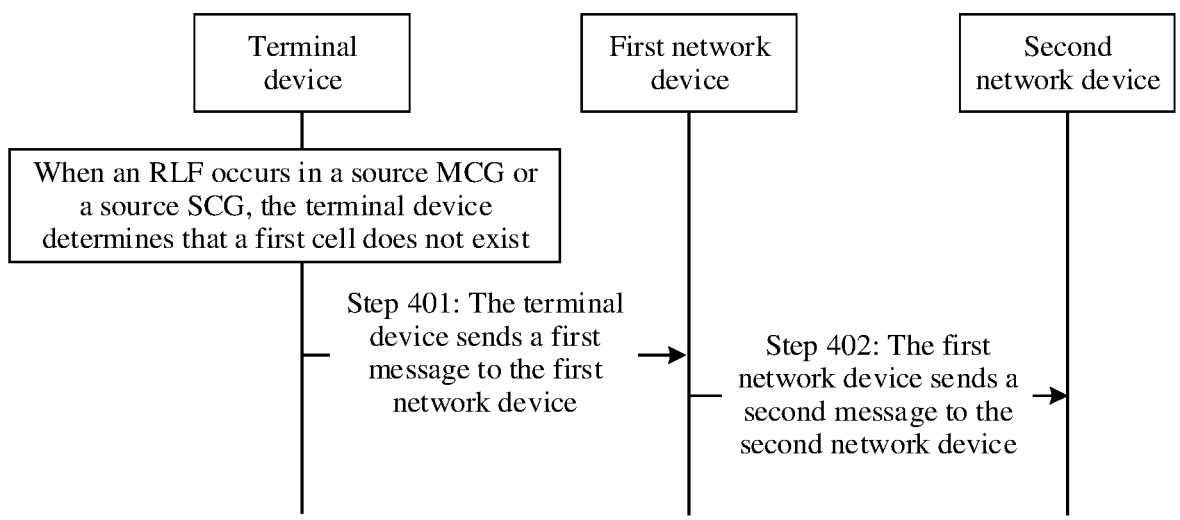
FIG. 4 is one of example flowcharts of a communication method according to at least one embodiment.

In response to receiving the first message sent by the terminal device, a first network device sends a second message to a second network device. The second message includes a part or all of the first message. FIG. 4 is an example flowchart of communication between the terminal device and a network side. The following steps is included.

Step 401: The terminal device sends the first message to the first network device.

The first message herein includes the first message shown in FIG. 3. For example, the first time period information includes T1, T2, or T1 and T2.

The first message further includes indication information indicating that an RLF occurs in a source MCG or a source SCG. Optionally, the first message further includes cell information of a source Pcell and/or a source PSCell and/or the at least one candidate target primary secondary cell, where the cell information includes at least one of the following: a PCI, frequency information, a CGI, or identification information (such as a measurement identifier or a configuration identifier). Optionally, the first message further includes signal quality of a cell. For example, in response to the RLF occurring in the source MCG, the first message further includes signal quality of at least one of the following cells: the source Pcell, the source PSCell, or the at least one candidate target primary secondary cell. Optionally, the first message further includes indication information indicating that the terminal device receives the first configuration information. Optionally, the first message further includes indication information indicating that the terminal device fails to determine the first cell. Optionally, the first message further includes the information about the at least one candidate target primary secondary cell and the corresponding information about the execution condition for primary secondary cell change.

Step 402: The first network device sends the second message to the second network device.

The second message herein includes a part or all of the first message. For example, the second message includes the first time period information as shown in FIG. 3. In response to CPC being initiated by a source SN (namely, the source secondary network device) that manages the source SCG, and the RLF occurring in the source MCG, the first network device is the source SN that manages the source SCG, and the second network device is a source MN (namely, the source primary network device) that manages the source MCG, or is a candidate SN (namely, a candidate secondary network device) that manages the candidate target primacy secondary cell. For example, the source SN sends the second message to the source MN and/or the candidate SN, or the source SN sends the second message to the source MN, and the source MN forwards a part or all of the second message to the candidate SN. After the source MN receives the second message, MN reconfiguration is performed, for example, changing an MN (where for example, another network device is configured as a new primary network device), changing an MCG but keeping the MN unchanged (where for example, another cell of the source MN is configured as a new Pcell), or releasing the source MN (where for example, configuration information of the source MCG is released). After receiving the second message, the candidate SN adjusts a CPC parameter. For example, the candidate SN adjusts the first configuration information. The second message further includes first information. The first information indicates delayed CPC, that is, after receiving the first message, the source SN considers that the delayed CPC occurs. The second message sent by the source SN includes the first information. Optionally, in response to the source SN sending the first configuration information to the terminal device, the source SN adjusts time for triggering the source MN to perform a CPC preparation procedure with the candidate SN, adjust the information about the execution condition for primary secondary cell change, and adjust time for sending the first configuration information. In response to the source MN or the candidate SN receiving the first information indicating that the delayed CPC occurs, optionally, in response to the first configuration information being sent by the source MN to the terminal device, the source MN adjusts, based on the first information, the time for performing CPC preparation with the candidate SN and the time for sending the first configuration information, and the candidate SN adjusts the information about the at least one candidate target primary secondary cell and time for configuring the information about the candidate target primary secondary cell.

In response to the CPC being initiated by the source SN, and the RLF occurring in the source SCG, the first network device is the source MN, and the second network device is the source SN, or is the candidate SN. Optionally, after receiving the first message, the source MN determines, based on the first message, that the delayed CPC occurs. Therefore, the second message sent by the source MN to the second network device (for example, the source SN) further includes the first information indicating that the delayed CPC occurs. In response to the source MN sending the first configuration information to the terminal device, the source MN adjusts, based on the first message, the time for performing CPC preparation with the candidate SN and the time for sending the first configuration information, and the source MN further releases the source SN (for example, release configuration information of the source SCG). Alternatively, the source MN keeps the source SN unchanged. For example, the source MN changes an SCG or a PSCell, and a changed-to SCG/PSCell still belongs to the source SN. Alternatively, the source MN changes the SN, for example, configure another network device as a new secondary network device. After receiving the second message sent by the source MN, the source SN considers that the delayed CPC occurs, and adjusts the time for triggering the source MN to perform the CPC preparation procedure with the candidate SN, the information about the execution condition for primary secondary cell change, and the time for sending the first configuration information. After receiving the second message sent by the source MN or forwarded by the source SN, the candidate SN adjusts the CPC parameter. For example, the candidate SN adjusts the information about the at least one candidate target primary secondary cell and the time for configuring the information about the candidate target primary secondary cell.

In response to the CPC being initiated by the source MN, and the RLF occurring in the source MCG, the first network device is the source SN, and the second network device is the source MN. After receiving the second message, the source MN determines, based on the second message, that the delayed CPC occurs. For example, based on the first time period information in the second message, the delayed CPC occurs. The delayed CPC herein means that the network device sends a message (for example, the first configuration information) used for a CPC procedure late, and consequently the terminal device cannot perform a primary secondary cell change. In response to the source MN sending the first configuration information to the terminal device, the source MN adjusts the time for performing CPC preparation with the candidate SN, the information about the execution condition for primary secondary cell change, and the time for sending the first configuration information. In another aspect, because the RLF occurs in the source MCG, the source MN further performs MN adjustment. For example, the source MN changes an MN (where for example, another network device is configured as a new primary network device), changes an MCG but keep the MN unchanged (where for example, another cell of the source MN is configured as a new PCell), or releases the source MN (where for example, configuration information of the source MCG is released). The source MN further forwards the second message to the candidate SN. The second message includes the first information indicating the delayed CPC. After receiving the second message, the candidate SN adjusts the CPC parameter. For example, the candidate SN adjusts the information about the at least one candidate target primary secondary cell. Alternatively, the candidate SN further adjusts the time for configuring the information about the candidate target primary secondary cell.

In response to the CPC being initiated by the source MN, and the RLF occurring in the source SCG, the first network device is the source MN, and the second network device is the source SN. After receiving the first message, the source MN releases the source SN. Alternatively, the source MN changes the SCG or the PSCell, and the changed-to SCG/PSCell still belongs to the source SN. Alternatively, the source MN changes the SN, for example, configure another network device as the new secondary network device. In addition, the source MN determines that the delayed CPC occurs. In response to the source MN sending the first configuration information to the terminal device, the source MN adjusts the time for performing CPC preparation with the candidate SN, the information about the execution condition for primary secondary cell change, and the time for sending the first configuration information. After receiving the second message sent by the source MN, the source SN adjusts time for triggering CPC based on the indication information indicating the delayed CPC in the second message. Optionally, the second network device is alternatively the candidate SN. After receiving the second message, the candidate SN adjusts the CPC parameter. For example, the candidate SN adjusts the information about the at least one candidate target primary secondary cell.

Optionally, after receiving the second message, the candidate SN sends a third message to the source MN or the source SN, where the third message includes a part or all of the second message. Optionally, the third message includes second information, and the second information indicates that the delayed CPC occurs.

Example 2: Before the Terminal Device Determines the First Cell, the RLF Occurs in the Source SCG In response to the RLF occurring in the source SCG before the first cell is determined, the terminal device further continues to determine, based on the first configuration information, whether the first cell exists. After the RLF occurs in the source SCG, the terminal device determines the first cell, and initiates access to the first cell. It should be noted that, depending on whether the terminal device successfully accesses the first cell, the first time period information is classified into the following three cases.

(1) the Terminal Device Successfully Accesses the First Cell.

Figure 5:
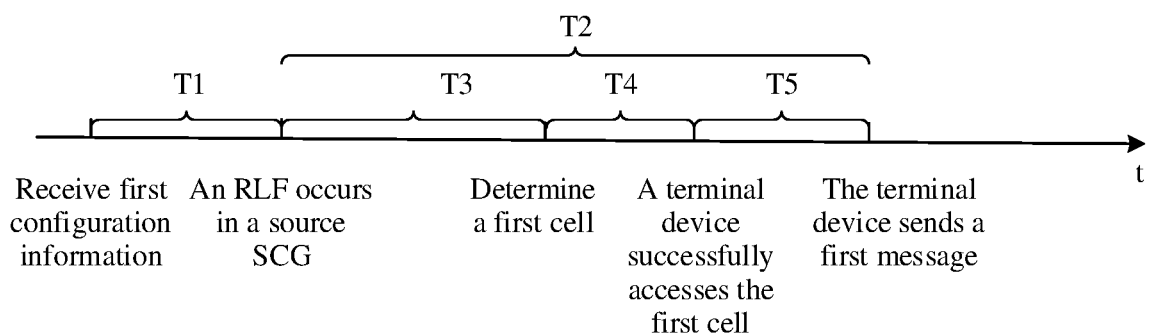
FIG. 5 is one of schematic diagrams of first time period information according to at least one embodiment.

In response to the terminal device successfully accessing the first cell, as shown in FIG. 5, the first time period information further includes at least one of the following:

information about a time period T1 from in response to the terminal device receiving the first configuration information to in response to the RLF occurring in the source SCG, information about a time period T3 from in response to the RLF occurring in the source SCG to in response to the terminal device determining the first cell, information about a time period T4 from in response to the terminal device determining the first cell to in response to the terminal device successfully accessing the first cell, information about a time period T5 from in response to the terminal device successfully accessing the first cell to in response to the terminal device sending the first message, or information about a time period T2 from in response to the RLF occurring in the source SCG to in response to the terminal device sending the first message. For example, the first time period information is T1, T2, T3, and T4, the first time period information is T1, T2, T3, T4, and T5, the first time period information is T1, T3, T4, and T5, or the first time period information is T1 and T2.

In addition, it should be noted that the first time period information in at least one embodiment is merely an example, and is not a limitation on the first time period information. It should be understood that the first time period information is another variation of information about a time period from in response to the terminal device receiving the first configuration information to in response to the terminal device reporting the first message. For example, the first time period information is a combination of each time period from in response to the terminal device receiving the first configuration message to in response to the terminal device reporting the first message, or is information about an entire time period from in response to the terminal device receiving the first configuration information to in response to the terminal device reporting the first message.

In this scenario, the first message further includes cell information of a source PCell and/or a source PSCell and/or the first cell and/or a candidate target primary secondary cell other than the first cell, where the cell information includes at least one of the following: a PCI, frequency information, a CGI, or identification information (such as a measurement identifier or a configuration identifier). Optionally, the first message further includes signal quality of a cell. For example, in response to the RLF occurring in the source SCG, and the terminal device successfully accesses the first cell, the first message further includes signal quality of at least one of the following cells: the source PCell, the source PSCell, the first cell, or the candidate target primary secondary cell other than the first cell. The first message further includes indication information indicating that the RLF occurs in the source SCG. Optionally, the first message further includes indication information indicating that the terminal device receives the first configuration information. Optionally, the first message further includes indication information indicating that the terminal device determines the first cell. Optionally, the first message further includes indication information indicating that the terminal device successfully accesses the first cell. Optionally, the first message further includes the information about the at least one candidate target primary secondary cell and the corresponding information about the execution condition for primary secondary cell change.

In this scenario, the first network device is a network device (namely, a target SN) to which the first cell belongs, or a network device that provides communication for the terminal device. The second network device is a source secondary network device (namely, a source SN or a network device that manages the source SCG) or a candidate SN.

(2) the Terminal Device Fails to Access the First Cell, and No RLF Occurs in the Source MCG.

Figure 6:
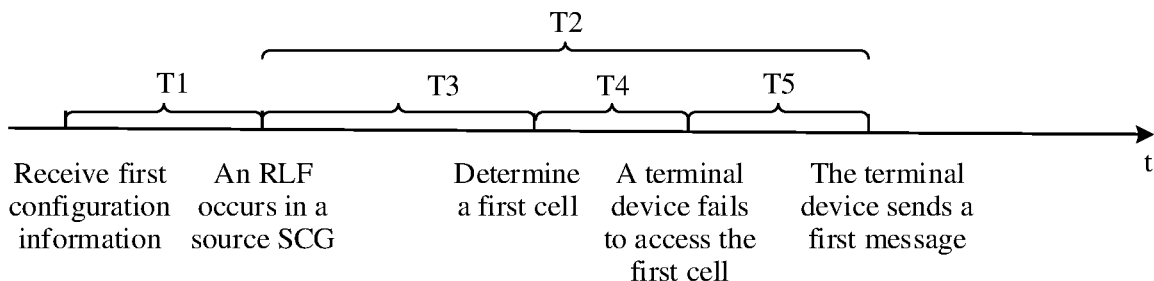
FIG. 6 is one of schematic diagrams of first time period information according to at least one embodiment.

In response to the terminal device failing to access the first cell, and no RLF occurring in the source MCG, as shown in FIG. 6, the first time period information further includes at least one of the following:

information about a time period T1 from in response to the terminal device receiving the first configuration information to in response to the RLF occurring in the source SCG, information about a time period T3 from in response to the RLF occurring in the source SCG to in response to the terminal device determining the first cell, information about a time period T4 from in response to the terminal device determining the first cell to in response to the terminal device failing to access the first cell, information about a time period T5 from in response to the terminal device failing to access the first cell to in response to the terminal device sending the first message, or information about a time period T2 from in response to the RLF occurring in the source SCG to in response to the terminal device sending the first message. For example, the first time period information is T1, T3, T4, and T5. Alternatively, the first time period information is T1, T2, T3, T4, and T5. Alternatively, the first time period information is another variation. This is not specifically limited.

In this scenario, the first message further includes cell information of a source PCell and/or a source PSCell and/or the first cell and/or a candidate target primary secondary cell other than the first cell, where the cell information includes at least one of the following: a PCI, frequency information, a CGI, or identification information (such as a measurement identifier or a configuration identifier). Optionally, the first message further includes signal quality of a cell. For example, in response to the RLF occurring in the source SCG, and the terminal device fails to access the first cell, the first message further includes signal quality of at least one of the following cells: the source PCell, the source PSCell, the first cell, or the candidate target primary secondary cell other than the first cell. The first message further includes indication information indicating that the RLF occurs in the source SCG. The first message further includes indication information indicating that no RLF occurs in the source MCG. Optionally, the first message further includes indication information indicating that the terminal device receives the first configuration information. Optionally, the first message further includes indication information indicating that the terminal device determines the first cell. Optionally, the first message further includes indication information indicating that the terminal device fails to access the first cell. Optionally, the first message further includes the information about the at least one candidate target primary secondary cell and the corresponding information about the execution condition for primary secondary cell change.

In this scenario, the first network device is a source MN, or a network device that provides communication for the terminal device. The second network device is a network device to which the first cell belongs, or a source SN.

(3) the Terminal Device Fails to Access the First Cell, and the RLF Occurs in the Source MCG.

Figure 7:
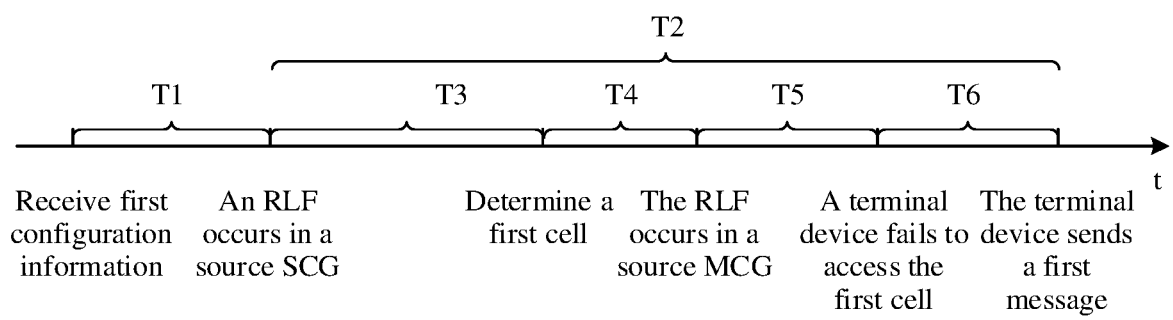
FIG. 7 is one of schematic diagrams of first time period information according to at least one embodiment.

In an implementation, in response to the terminal device failing to access the first cell, and the RLF occurs in the source MCG, as shown in FIG. 7, the first time period information includes at least one of the following:

information about a time period T1 from in response to the terminal device receiving the first configuration information to in response to the RLF occurring in the source SCG, information about a time period T3 from in response to the RLF occurring in the source SCG to in response to the terminal device determining the first cell, information about a time period T4 from in response to the terminal device determining the first cell to in response to the RLF occurring in the source MCG, information about a time period T5 from in response to the RLF occurring in the source MCG to in response to the terminal device failing to access the first cell, information about a time period T6 from in response to the terminal device failing to access the first cell to in response to the terminal device sending the first message, or information about a time period T2 from in response to the RLF occurring in the source SCG to in response to the terminal device sending the first message. For example, the first time period information is T1, T3, T4, T5, and T6. Alternatively, the first time period information is T1, T2, T3, T4, T5, and T6. Alternatively, the first time period information is another variation. This is not specifically limited.

Figure 8:
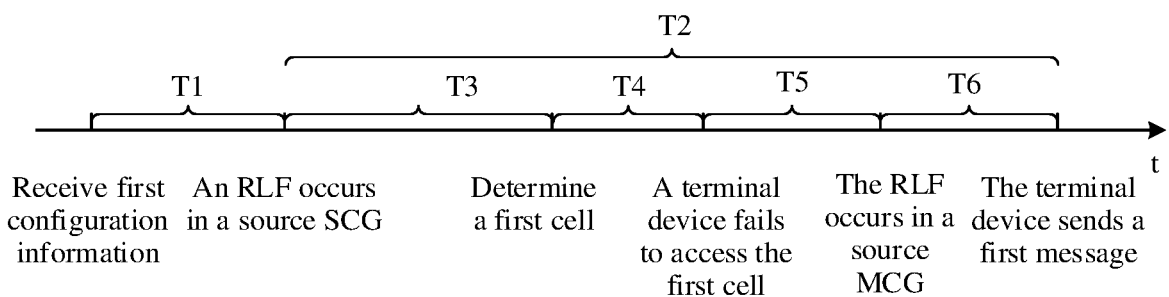
FIG. 8 is one of schematic diagrams of first time period information according to at least one embodiment.

In another implementation, in response to the terminal device failing to access the first cell, and the RLF occurring in the source MCG, as shown in FIG. 8, the first time period information includes at least one of the following:

information about a time period T1 from in response to the terminal device receiving the first configuration information to in response to the RLF occurring in the source SCG, information about a time period T3 from in response to the RLF occurring in the source SCG to in response to the terminal device determining the first cell, information about a time period T4 from in response to the terminal device determining the first cell to in response to the terminal device failing to access the first cell, information about a time period T5 from in response to the terminal device failing to access the first cell to in response to the RLF occurring in the source MCG, information about a time period T6 from in response to the RLF occurring in the source MCG to in response to the terminal device sending the first message, or information about a time period T2 from in response to the RLF occurring in the source SCG to in response to the terminal device sending the first message. For example, the first time period information is T1, T3, T4, T5, and T6. Alternatively, the first time period information is T1, T2, T3, T4, T5, and T6. Alternatively, the first time period information is another variation. This is not specifically limited.

In this scenario, the first message further includes cell information of a source PCell and/or a source PSCell and/or the first cell and/or a candidate target primary secondary cell other than the first cell, where the cell information includes at least one of the following: a PCI, frequency information, a CGI, or identification information (such as a measurement identifier or a configuration identifier). Optionally, the first message further includes signal quality of a cell. For example, in response to the RLF occurring in the source SCG, in response to the terminal device failing to access the first cell, or in response to the RLF occurring in the source MCG, the first message further includes signal quality of at least one of the following cells: the source PCell, the source PSCell, the first cell, or the candidate target primary secondary cell other than the first cell. The first message further includes indication information indicating that the RLF occurs in the source SCG. The first message further includes indication information indicating that the RLF occurs in the source MCG. Optionally, the first message further includes indication information indicating that the terminal device receives the first configuration information. Optionally, the first message further includes indication information indicating that the terminal device determines the first cell. Optionally, the first message further includes indication information indicating that the terminal device fails to access the first cell. Optionally, the first message further includes the information about the at least one candidate target primary secondary cell and the corresponding information about the execution condition for primary secondary cell change.

In this scenario, the first network device is a network device that provides communication for the terminal device. The second network device is a network device to which the first cell belongs, a source SN, or a source MN.

Figure 9:
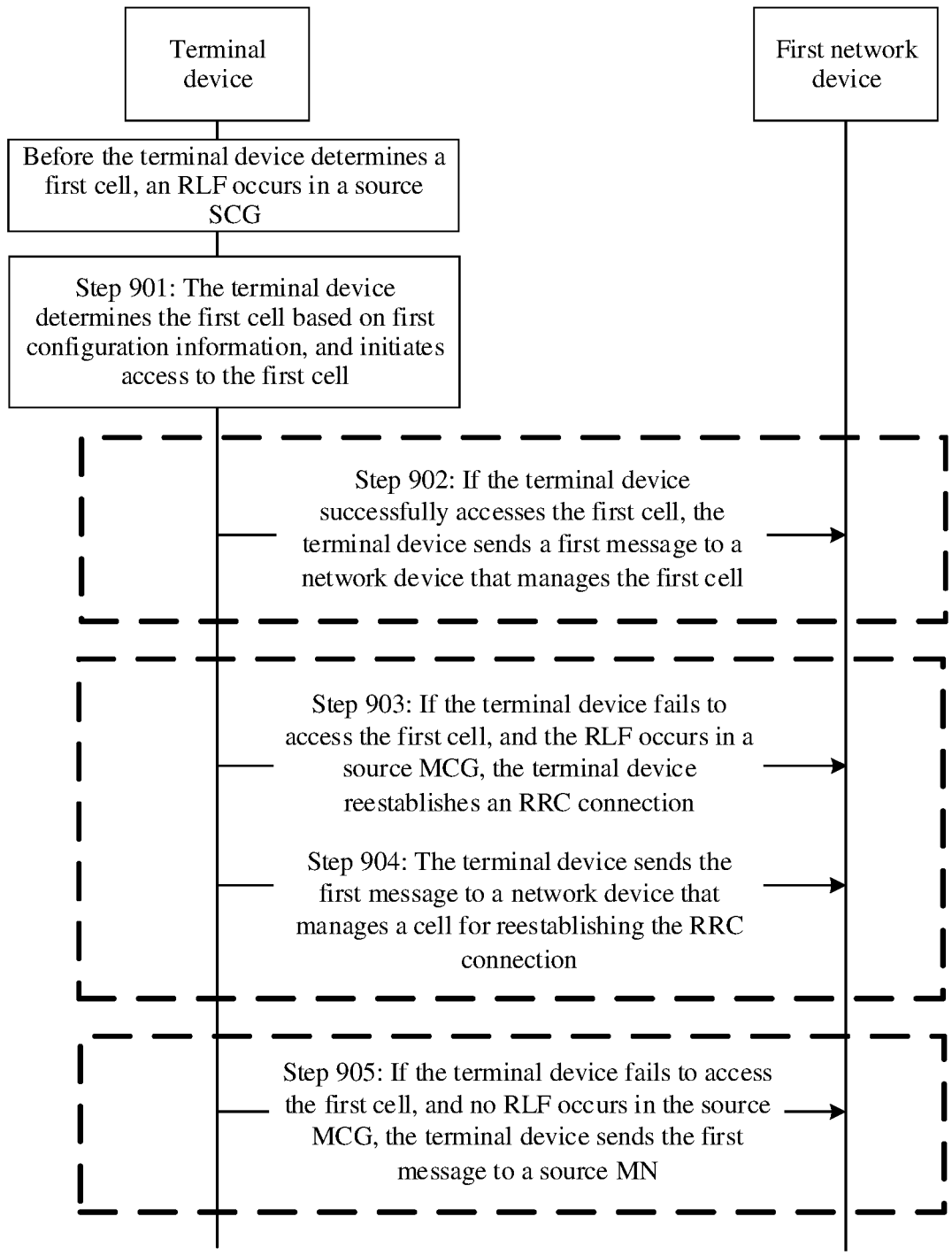
FIG. 9 is one of example flowcharts of a communication method according to at least one embodiment.

For the foregoing implementations, after receiving the first message, the first network device sends the second message to the second network device. FIG. 9 is an example flowchart of communication between the terminal device and a network side. The following steps is included.

Step 901: The terminal device determines the first cell based on the first configuration information, and initiates access to the first cell.

The terminal device determines, based on the first configuration information, a first cell that meets a CPC change condition, and initiate access to the first cell.

Step 902: In response to the terminal device successfully accessing the first cell, the terminal device sends the first message to a network device that manages the first cell.

The network device that manages the first cell is the first network device. For content included in the first message, refer to the foregoing descriptions. Alternatively, the terminal device sends the first message to the network device that provides communication for the terminal device, and it is not required that the terminal device only sends the first message to the network device to which the first cell belongs. In response to CPC being triggered by the first network device, after receiving the first message, the first network device considers that delayed CPC occurs, and adjusts time for triggering the CPC. For example, the first network device sends the first configuration information to the terminal device earlier. Optionally, the first network device further adjusts the first configuration information, for example, reduce an execution condition for primary secondary cell change. In response to CPC being triggered by the source SN, after the first network device receives the first message, the first network device sends a second message to the source SN (namely, the second network device). The second message includes a part or all content of the first message. Optionally, the second message further includes indication information, namely, the first information, indicating delayed CPC. After receiving the second message, the source SN adjusts time for triggering the CPC. For example, the source SN sends the first configuration information to the terminal device earlier. Optionally, the source SN further adjusts the first configuration information, for example, reduce an execution condition for primary secondary cell change.

Optionally, after receiving the second message, the candidate SN sends a third message to the source MN or the source SN, where the third message includes a part or all of the second message. Optionally, the third message includes second information, and the second information indicates that the delayed CPC occurs.

Step 903: In response to the terminal device failing to access the first cell, and the RLF occurring in the source MCG, the terminal device initiates an RRC reestablishment procedure, and performs Step 904.

Step 904: The terminal device sends the first message to a network device to which a cell for RRC reestablishment belongs.

The network device to which the cell for RRC reestablishment belongs is the first network device. Correspondingly, the cell for RRC reestablishment is different from the first cell, and is a cell managed by the first network device. Alternatively, the terminal device sends the first message to the network device that provides communication for the terminal device, and it is not required that the terminal device only sends the first message to the network device to which the cell for RRC reestablishment belongs. For content included in the first message, refer to the foregoing descriptions.

After receiving the first message, the first network device sends a second message to the source MN and/or the source SN, so that the source MN or the source SN adjusts time for triggering the CPC. For example, the source MN or the source SN sends the first configuration information to the terminal device earlier. Optionally, the source MN or the source SN further adjusts the first configuration information, for example, reduce an execution condition for primary secondary cell change. Optionally, the first network device further sends the second message to the candidate SN, so that the candidate SN adjusts the first configuration information based on the second message. For example, the candidate SN adjusts the information about the candidate target primary secondary cell. The second message includes a part or all content of the first message. Details are not described herein again.

Step 905: In response to the terminal device failing to access the first cell, and no RLF occurring in the source MCG, the terminal device sends the first message to the source MN.

The source MN is the first network device. The first message herein includes the first time period information as shown in FIG. 5 to FIG. 8. For details, refer to the foregoing descriptions. Alternatively, the terminal device sends the first message to the network device that provides communication for the terminal device, and it is not required that the terminal device only sends the first message to the source MN. In response to CPC being triggered by the first network device, after receiving the first message, the first network device considers that delayed CPC occurs, and adjusts time for triggering the CPC. For example, the first network device sends the first configuration information to the terminal device earlier. Optionally, the first network device further adjusts the first configuration information, for example, reduce an execution condition for primary secondary cell change. Optionally, the first network device sends the second message to the candidate SN (for example, the network device to which the first cell belongs or a network device to which another candidate cell belongs), so that the candidate SN adjusts a CPC parameter based on the second message. For example, the candidate SN adjusts the information about the candidate target primary secondary cell. Optionally, the first network device releases the source SN, or change an SCG/PSCell. In response to CPC being triggered by the source SN, after the first network device receives the first message, the first network device sends a second message to the source SN (namely, the second network device). The second message includes a part or all content of the first message. Optionally, the second message further includes indication information indicating delayed CPC. After receiving the second message, the source SN adjusts time for triggering the CPC. For example, the source SN sends the first configuration information to the terminal device earlier. Optionally, the source SN further adjusts the first configuration information, for example, reduce an execution condition for primary secondary cell change. Optionally, the first network device further sends the second message to the candidate SN, so that the candidate SN adjusts the first configuration information based on the second message. For example, the candidate SN adjusts the information about the candidate target primary secondary cell. The second message includes a part or all content of the first message. Details are not described herein again.

Optionally, after receiving the second message, the candidate SN sends a third message to the source MN or the source SN, where the third message includes a part or all of the second message. Optionally, the third message includes second information, and the second information indicates that the delayed CPC occurs.

Figure 10:
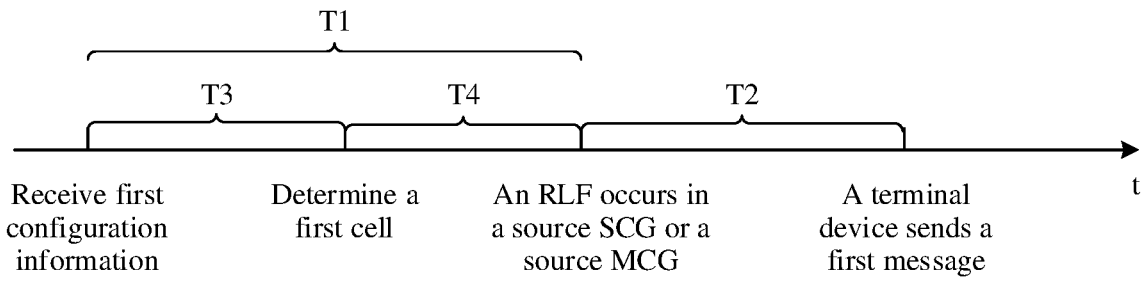
FIG. 10 is one of schematic diagrams of first time period information according to at least one embodiment.

Example 3: Before the RLF Occurs in the Source SCG or the Source MCG, the Terminal Device Determines the First Cell Before the RLF occurs in the source SCG or the source MCG, in response to the terminal device determining the first cell, as shown in FIG. 10, the first time period information includes at least one of the following:
information about a time period T1 from in response to the terminal device receiving first configuration information to in response to the RLF occurring in the source SCG or the source MCG, information about a time period T3 from in response to the terminal device receiving the first configuration information to in response to the terminal device determining the first cell, information about a time period T4 from in response to the terminal device determining the first cell to in response to the RLF occurring in the source SCG or the source MCG, or information about a time period T2 from in response to the RLF occurring in the source SCG or the source MCG to in response to the terminal device sending the first message. For example, the first time period information is T2, T3, and T4. Alternatively, the first time period information is T1, T2, T3, and T4. Alternatively, the first time period information is another variation. This is not specifically limited.

In an implementation, in response to the RLF occurring in the source SCG or the source MCG, even in response to the terminal device determining the first cell, the terminal device does not access or stops accessing the first cell. In this case, the first message further includes cell information of a source PCell and/or a source PSCell and/or the first cell and/or a candidate target primary secondary cell other than the first cell, where the cell information includes at least one of the following: a PCI, frequency information, a CGI, or identification information (such as a measurement identifier or a configuration identifier). Optionally, the first message further includes signal quality of a cell. For example, in response to the RLF occurring in the source SCG or the source MCG, the first message further includes signal quality of at least one of the following cells: the source PCell, the source PSCell, the first cell, or the candidate target primary secondary cell other than the first cell. The first message further includes indication information indicating that the RLF occurs in the source SCG or the source MCG. Optionally, the first message further includes indication information indicating that the terminal device receives the first configuration information. Optionally, the first message further includes indication information indicating that the terminal device determines the first cell. Optionally, the first message further includes indication information indicating that the terminal device does not access or stops accessing the first cell. Optionally, the first message further includes information about at least one candidate target primary secondary cell and corresponding information about an execution condition for primary secondary cell change.

In response to the CPC being initiated by a source MN, and the RLF occurring in the source SCG, the first network device is the source MN, and the second network device is a source SN or a candidate SN (for example, a network device to which the first cell belongs or a network device to which another candidate cell belongs). The source MN determines, based on the first message, that delayed CPC occurs. Therefore, the second message further includes first information indicating that the delayed CPC occurs. The source MN adjusts time for triggering CPC. For example, the source MN sends the first configuration information to the terminal device earlier. Optionally, the source MN further adjusts the first configuration information, for example, reduce an execution condition for primary secondary cell change. Optionally, the source MN sends the second message to the candidate SN, so that the candidate SN adjusts a CPC parameter based on the second message. For example, the candidate SN adjusts the information about the candidate target primary secondary cell. Optionally, the source MN releases the source SN, or change an SCG/PSCell.

In response to the CPC being initiated by the source SN, and the RLF occurring in the source SCG, the first network device is the source MN, and the second network device is the source SN or the candidate SN (for example, a network device to which the first cell belongs or a network device to which another candidate cell belongs). Optionally, after receiving the first message, the source MN releases the source SN, or changes an SCG/PSCell, where a changed-to SCG/PSCell is long to or not belong to the source SN. The source MN sends the second message to the source SN or the candidate SN. Alternatively, the source MN sends the second message to the source SN, and the source SN forwards the received second message to the candidate SN. The second message includes a part or all content of the first message. Optionally, the second message further includes indication information indicating delayed CPC. After receiving the second message, the source SN determines that the delayed CPC occurs, and adjusts time for triggering the CPC. For example, the source SN sends the first configuration information to the terminal device earlier. Optionally, the source SN further adjusts the first configuration information, for example, reduce an execution condition for primary secondary cell change. Optionally, the candidate SN adjusts the first configuration information based on the second message. For example, the candidate SN adjusts the information about the candidate target primary secondary cell.

In another implementation, in response to the RLF occurring in the source SCG or the source MCG, and the terminal device has determined the first cell, the terminal device begins or continues to access the first cell. Depending on whether the terminal device successfully accesses the first cell, first time period information is different, and includes the following two cases.

(1) the Terminal Device Successfully Accesses the First Cell.

Figure 11:
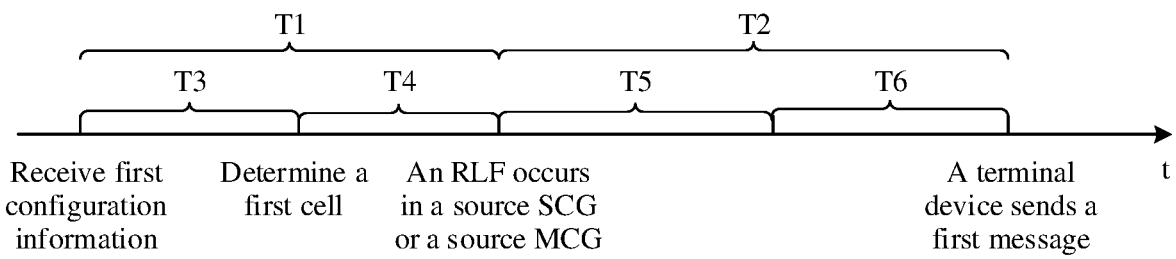
FIG. 11 is one of schematic diagrams of first time period information according to at least one embodiment.

In response to the terminal device successfully accessing the first cell, as shown in FIG. 11, the first time period information includes at least one of the following:
information about a time period T1 from in response to the terminal device receiving the first configuration information to in response to the RLF occurring in the source SCG or the source MCG, information about a time period T3 from in response to the terminal device receiving the first configuration information to in response to the terminal device determining the first cell, information about a time period T4 from in response to the terminal device determining the first cell to in response to the RLF occurring in the source SCG or the source MCG, information about a time period T5 from in response to the RLF occurring in the source MCG or the source SCG to in response to the terminal device accessing the first cell, information about a time period T6 from in response to the terminal device accessing the first cell to in response to the terminal device sending the first message, or information about a time period T2 from in response to the RLF occurring in the source SCG or the source MCG to in response to the terminal device sending the first message. For example, the first time period information is T1, T3, T4, T5, and T6. Alternatively, the first time period information is T1, T2, T3, T4, T5, and T6. Alternatively, the first time period information is another variation. This is not specifically limited.

The first message further includes cell information of a source PCell and/or a source PSCell and/or the first cell and/or a candidate target primary secondary cell other than the first cell, where the cell information includes at least one of the following: a PCI, frequency information, a CGI, or identification information (such as a measurement identifier or a configuration identifier). Optionally, the first message further includes signal quality of a cell. For example, in response to the RLF occurring in the source SCG or in response to the RLF occurring in the source MCG, or in response to the terminal device successfully accessing the first cell, the first message further includes signal quality of at least one of the following cells: the source PCell, the source PSCell, the first cell, or the candidate target primary secondary cell other than the first cell. The first message further includes indication information indicating that the RLF occurs in the source SCG or the source MCG. Optionally, the first message further includes indication information indicating that the terminal device receives the first configuration information. Optionally, the first message further includes indication information indicating that the terminal device determines the first cell. Optionally, the first message further includes indication information indicating that the terminal device begins or continues to access the first cell in response to the RLF occurring in the source SCG or the source MCG. Optionally, the first message further includes indication information indicating that the terminal device successfully accesses the first cell. Optionally, the first message further includes information about at least one candidate target primary secondary cell and corresponding information about an execution condition for primary secondary cell change.

Figure 12:
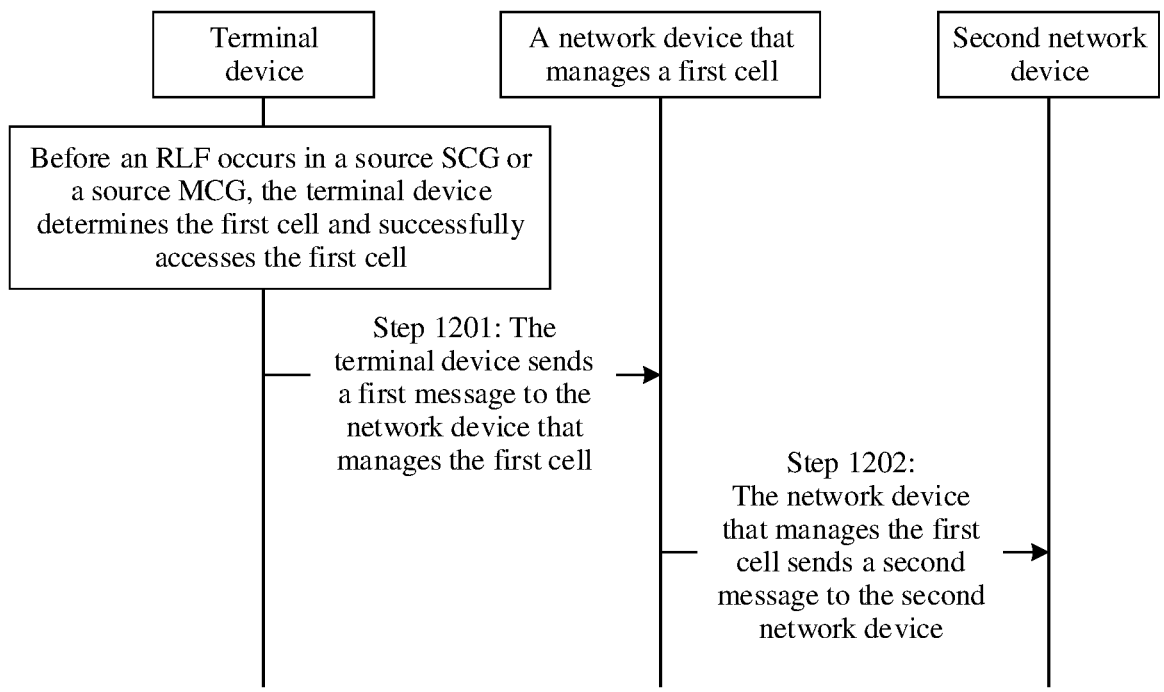
FIG. 12 is one of example flowcharts of a communication method according to at least one embodiment.

After successfully accessing the first cell, the terminal device sends the first message to a network device that manages the first cell. Correspondingly, the network device that manages the first cell is the foregoing first network device. After receiving the first message from the terminal device, the first network device further sends a second message to the second network device. FIG. 12 is an example flowchart of communication between the terminal device and the first network device. The following steps is included.

Step 1201: The terminal device sends the first message to the first network device.

The first network device is the network device that manages the first cell. For content included in the first message, refer to the foregoing descriptions. Alternatively, the terminal device sends the first message to the network device that provides communication for the terminal device, and it is not required that the terminal device only sends the first message to the network device to which the first cell belongs.

In response to CPC being triggered by the first network device, after receiving the first message, the first network device considers that delayed CPC occurs, and adjusts time for triggering the CPC. For example, the first network device sends the first configuration information to the terminal device earlier. Optionally, the first network device further adjusts the first configuration information, for example, reduce an execution condition for primary secondary cell change. In response to CPC being triggered by the source MN, after the first network device receives the first message, the first network device sends a second message to the source MN. The second message includes a part or all content of the first message. Optionally, the second message further includes indication information indicating delayed CPC. After receiving the second message, the source MN adjusts time for triggering the CPC. For example, the source MN sends the first configuration information to the terminal device earlier. Optionally, the source MN further adjusts the first configuration information, for example, reduce an execution condition for primary secondary cell change.

Step 1202: The network device that manages the first cell sends the second message to the second network device.

The second network device herein is the source MN, or is the candidate SN. For example, the network device that manages the first cell sends the second message to the source MN and the candidate SN; or the network device that manages the first cell sends the second message to the source MN. After the source MN receives the second message, MN reconfiguration is performed. For example, the source MN changes an MCG/PCell, and a changed-to MCG/PCell is long to or not belong to the source MN. The candidate SN adjusts a CPC parameter based on the second message. For example, the candidate SN adjusts the information about the candidate target primary secondary cell.

Optionally, after receiving the second message, the candidate SN sends a third message to the source MN or the source SN, where the third message includes a part or all of the second message. Optionally, the third message includes second information, and the second information indicates that the delayed CPC occurs.

(2) the Terminal Device Fails to Access the First Cell.

In response to the terminal device failing to access the first cell, the first time period information is different depending on whether the first cell is determined before the RLF occurs in the source SCG or before the RLF occurs in the source MCG. The following separately describes different first time period information.

(1) the Terminal Device Determines the First Cell Before the RLF Occurs in the Source MCG, the Terminal Device Fails to Access the First Cell, and No RLF Occurs in the Source SCG.

Figure 13:
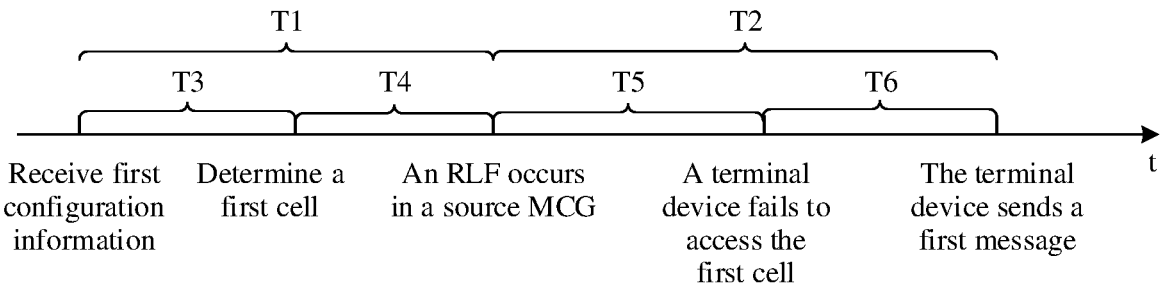
FIG. 13 is one of schematic diagrams of first time period information according to at least one embodiment.

As shown in FIG. 13, the first time period information includes at least one of the following:

information about a time period T1 from in response to the terminal device receiving the first configuration information to in response to the RLF occurring in the source MCG, information about a time period T3 from in response to the terminal device receiving the first configuration information to in response to the terminal device determining the first cell, information about a time period T4 from in response to the terminal device determining the first cell to in response to the RLF occurring in the source MCG, information about a time period T5 from in response to the RLF occurring in the source MCG to in response to the terminal device failing to access the first cell, information about a time period T6 from in response to the terminal device failing to access the first cell to in response to the terminal device sending the first message, or information about a time period T2 from in response to the RLF occurring in the source MCG to in response to the terminal device sending the first message. For example, the first time period information is T3, T4, T5, and T6. Alternatively, the first time period information is T1, T2, T3, T4, T5, and T6. Alternatively, the first time period information is another variation. This is not limited.

(2) the Terminal Device Determines the First Cell Before the RLF Occurs in the Source MCG, the Terminal Device Fails to Access the First Cell, and the RLF Occurs in the Source SCG.

Figure 14:
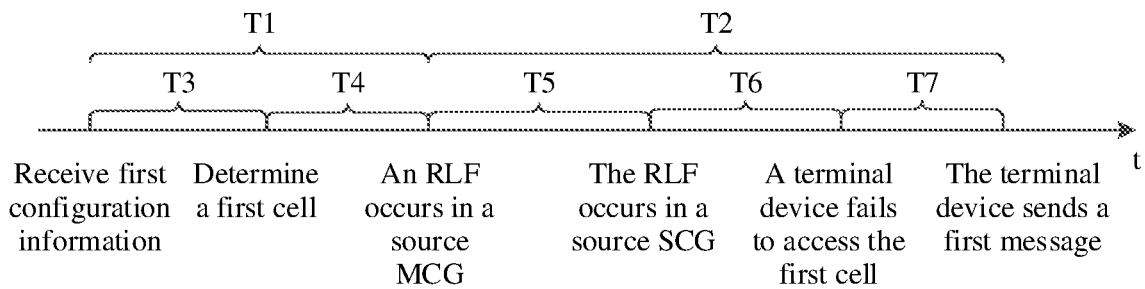
FIG. 14 is one of schematic diagrams of first time period information according to at least one embodiment.

In an implementation, as shown in FIG. 14, the first time period information includes at least one of the following:

information about a time period T1 from in response to the terminal device receiving the first configuration information to in response to the RLF occurring in the source MCG, information about a time period T3 from in response to the terminal device receiving the first configuration information to in response to the terminal device determining the first cell, information about a time period T4 from in response to the terminal device determining the first cell to in response to the RLF occurring in the source MCG, information about a time period T5 from in response to the RLF occurring in the source MCG to in response to the RLF occurring in the source SCG, information about a time period T6 from in response to the RLF occurring in the source SCG to in response to the terminal device failing to access the first cell, information about a time period T7 from in response to the terminal device failing to access the first cell to in response to the terminal device sending the first message, or information about a time period T2 from in response to the RLF occurring in the source MCG to in response to the terminal device sending the first message. For example, the first time period information is T3, T4, T5, T6, and T7. Alternatively, the first time period information is T1, T2, T3, T4, T5, T6, and T7. Alternatively, the first time period information is another variation. This is not limited.

Figure 15:
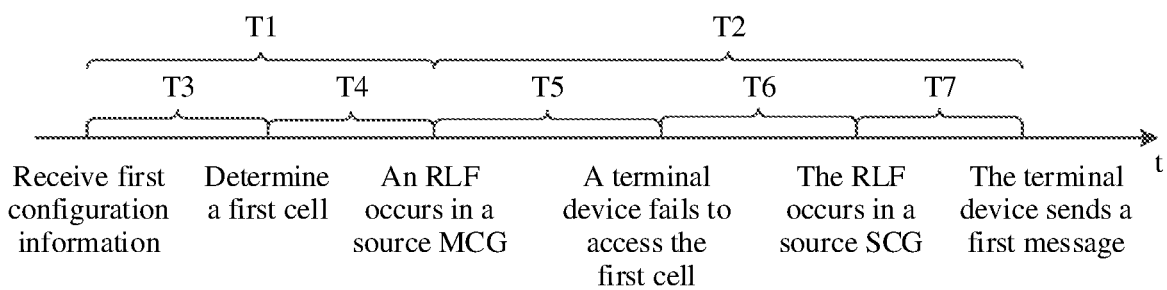
FIG. 15 is one of schematic diagrams of first time period information according to at least one embodiment.

In another implementation, as shown in FIG. 15, the first time period information includes at least one of the following:

information about a time period T1 from in response to the terminal device receiving the first configuration information to in response to the RLF occurring in the source MCG, information about a time period T3 from in response to the terminal device receiving the first configuration information to in response to the terminal device determining the first cell, information about a time period T4 from in response to the terminal device determining the first cell to in response to the RLF occurring in the source MCG, information about a time period T5 from in response to the RLF occurring in the source MCG to in response to the terminal device failing to access the first cell, information about a time period T6 from in response to the terminal device failing to access the first cell to in response to the RLF occurring in the source SCG, information about a time period T7 from in response to the RLF occurring in the source SCG to in response to the terminal device sending the first message, or information about a time period T2 from in response to the RLF occurring in the source MCG to in response to the terminal device sending the first message. For example, the first time period information is T3, T4, T5, T6, and T7. Alternatively, the first time period information is T1, T2, T3, T4, T5, T6, and T7. Alternatively, the first time period information is another variation. This is not limited.

Figure 16:
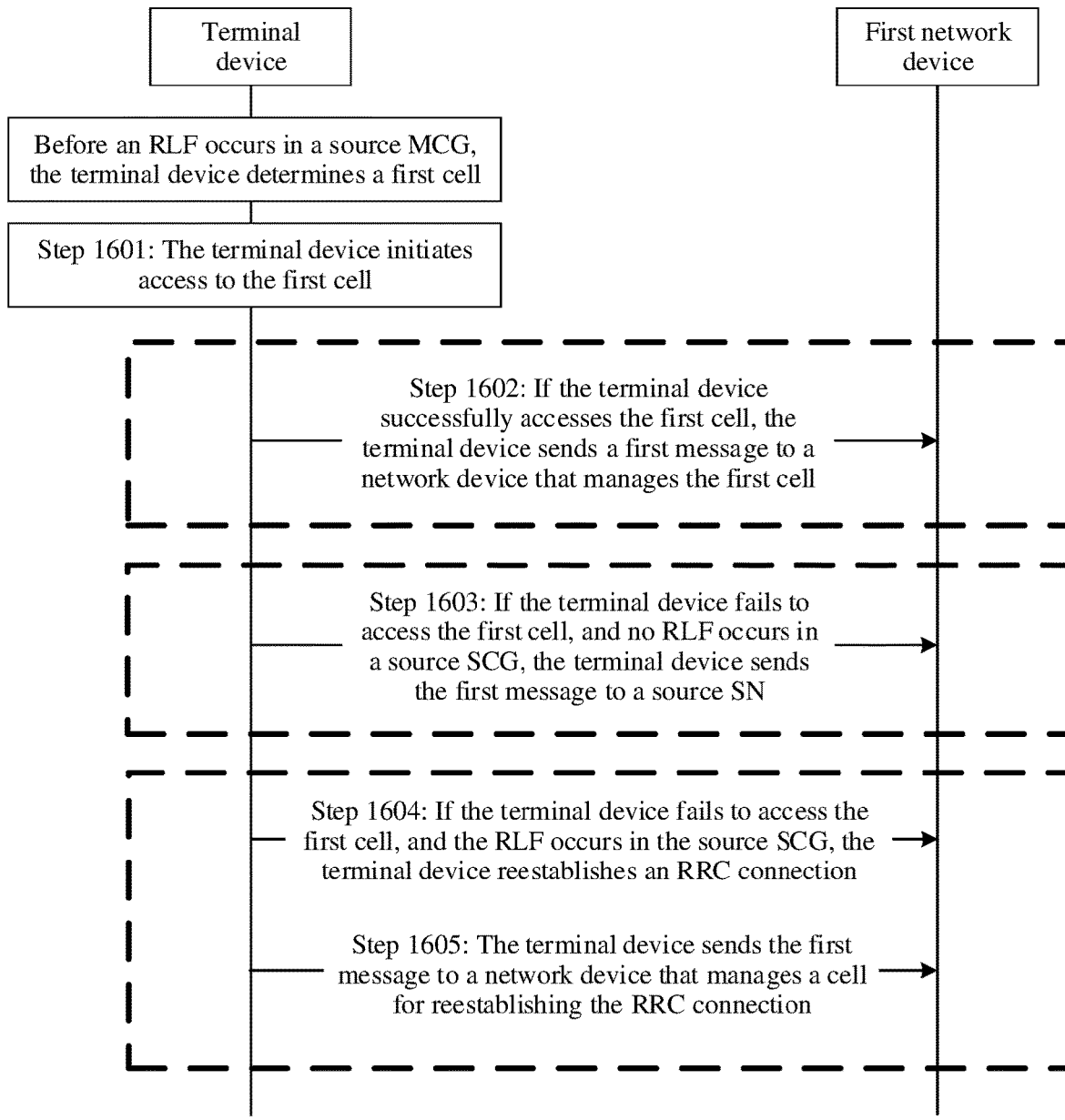
FIG. 16 is one of example flowcharts of a communication method according to at least one embodiment.

After receiving the first message from the terminal device, the first network device further sends a second message to the second network device. FIG. 16 is an example flowchart of communication between the terminal device and a network side. The following steps is included.

Step 1601: After the first cell is determined, the RLF occurs in the source MCG, and the terminal device initiates access to the first cell.

Step 1602: In response to the terminal device successfully accessing the first cell, the terminal device sends the first message to the first network device.

The first network device herein is the network device that manages the first cell, and the second network device is the source MN, or is the candidate SN. Alternatively, the terminal device sends the first message to the network device that provides communication for the terminal device, and it is not required that the terminal device only sends the first message to the network device to which the first cell belongs. For example, the first network device sends the second message to the source MN. The second message is a part or all of the first message. For example, the second message includes the first time period information as shown in FIG. 13 to FIG. 15. The source MN changes an MCG/PSCell, and a changed-to MCG/PSCell is long to or not belong to the source MN. Optionally, in response to CPC being triggered by the source MN, the source MN adjusts time for triggering CPC. For example, the source MN sends first configuration information to the terminal device earlier. Optionally, the source MN further adjusts the first configuration information, for example, reduce an execution condition for primary secondary cell change. The first network device further sends the second message to a source SN or the candidate SN, or the source MN sends the second message to the source SN and the candidate SN after receiving the second message. After the source SN receives the second message, in response to CPC being triggered by the source SN, the source SN adjusts time for triggering CPC. For example, the source SN sends the first configuration information to the terminal device earlier. Optionally, the source SN further adjusts the first configuration information, for example, reduce an execution condition for primary secondary cell change. In another aspect, after receiving the second message, the candidate SN adjusts a CPC parameter, for example, adjust information about a candidate target primary secondary cell.

Step 1603: In response to the terminal device failing to access the first cell, and no RLF occurring in the source SCG, the terminal device sends the first message to the first network device.

In this case, the first network device is the source SN, and the second network device is the source MN, or is the candidate SN. Alternatively, the terminal device sends the first message to the network device that provides communication for the terminal device, and it is not required that the terminal device only sends the first message to the source SN. In response to CPC being triggered by the source SN, the source SN adjusts time for triggering CPC. For example, the source SN sends the first configuration information to the terminal device earlier. Optionally, the source SN further adjusts the first configuration information, for example, reduce an execution condition for primary secondary cell change. Optionally, the source SN further forwards the second message to the source MN. The second message herein includes a part or all of the first message. For example, the second message includes the first time period information as shown in FIG. 13 to FIG. 15. For details, refer to the foregoing descriptions. Optionally, the source MN changes an MCG/PSCell, where a changed-to MCG/PSCell is long to or not belong to the source MN. Optionally, in response to CPC being triggered by the source MN, the source MN adjusts time for triggering CPC. For example, the source MN sends the first configuration information to the terminal device earlier. Optionally, the source MN further adjusts the first configuration information, for example, reduce an execution condition for primary secondary cell change. Optionally, the source SN further sends the second message to the candidate SN, or the source MN sends the second message to the candidate SN. After receiving the second message, the candidate SN adjusts a CPC parameter. For example, the candidate SN adjusts the information about the candidate target primary secondary cell. Optionally, after receiving the second message, the candidate SN sends a third message to the source MN or the source SN, where the third message includes a part or all of the second message. Optionally, the third message includes second information, and the second information indicates that delayed CPC occurs.

Step 1604: In response to the terminal device failing to access the first cell, and the RLF occurring in the source SCG, the terminal device reestablishes an RRC connection.

Step 1605: The terminal device sends the first message to the first network device.

The first network device is a network device that manages a cell A, and the second network device is the source MN, or is the candidate SN. The cell A herein is a cell accessed by the terminal device in response to the terminal device re-establishing the RRC connection, and is different from the first cell. Alternatively, the terminal device sends the first message to the network device that provides communication for the terminal device, and it is not required that the terminal device only sends the first message to the network device to which the cell A belongs. The network device that manages the cell A or the first network device sends the second message to the source MN, the source SN, or the candidate SN. The second message herein includes a part or all of the first message. For example, the second message includes the first time period information as shown in FIG. 13 to FIG. 15. Alternatively, the network device that manages the cell A sends the second message to the source MN, and the source MN sends the second message to the source SN or the candidate SN. Optionally, after receiving the second message, the source MN changes an MCG/PSCell, and a changed-to MCG/PSCell is long to or not belong to the source MN. Optionally, in response to CPC being triggered by the source MN, the source MN adjusts time for triggering CPC. For example, the source MN sends first configuration information to the terminal device earlier. Optionally, the source MN further adjusts the first configuration information, for example, reduce an execution condition for primary secondary cell change. Optionally, after the source SN receives the second message, in response to CPC being triggered by the source SN, the source SN adjusts time for triggering CPC. For example, the source SN sends the first configuration information to the terminal device earlier. Optionally, the source SN further adjusts the first configuration information, for example, reduce an execution condition for primary secondary cell change. Optionally, after receiving the second message, the candidate SN adjusts a CPC parameter. For example, the candidate SN adjusts the information about the candidate target primary secondary cell.

Optionally, after receiving the second message, the candidate SN sends a third message to the source MN or the source SN, where the third message includes a part or all of the second message. Optionally, the third message includes second information, and the second information indicates that the delayed CPC occurs.

(3) the Terminal Device Determines the First Cell Before the RLF Occurs in the Source SCG, the Terminal Device Fails to Access the First Cell, and No RLF Occurs in the Source MCG.

Figure 17:
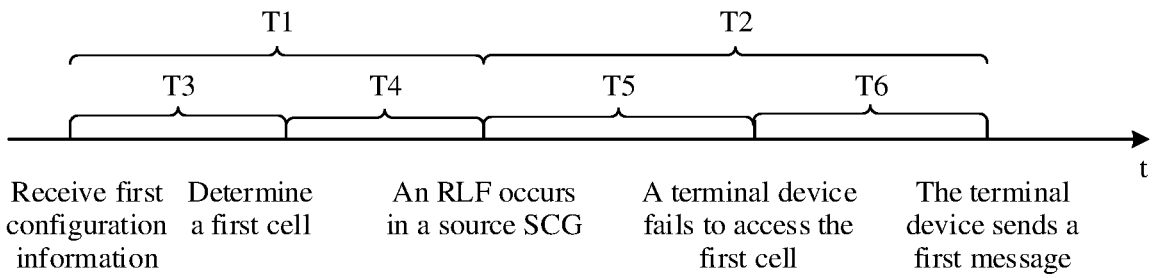
FIG. 17 is one of schematic diagrams of first time period information according to at least one embodiment.

In response to the terminal device failing to access the first cell, and no RLF occurring in the source MCG, as shown in FIG. 17, the first time period information further includes at least one of the following:

information about a time period T1 from in response to the terminal device receiving the first configuration information to in response to the RLF occurring in the source SCG, information about a time period T3 from in response to the terminal device receiving the first configuration information to in response to the terminal device determining the first cell, information about a time period T4 from in response to the terminal device determining the first cell to in response to the RLF occurring in the source SCG, information about a time period T5 from in response to the RLF occurring in the source SCG to in response to the terminal device failing to access the first cell, information about a time period T6 from in response to the terminal device failing to access the first cell to in response to the terminal device sending the first message, or information about a time period T2 from in response to the RLF occurring in the source SCG to in response to the terminal device sending the first message. For example, the first time period information is T3, T4, T5, and T6. Alternatively, the first time period information is T1, T2, T3, T4, T5, and T6. Alternatively, the first time period information is another variation. This is not limited.

(4) the Terminal Device Determines the First Cell Before the RLF Occurs in the Source SCG, the Terminal Device Fails to Access the First Cell, and the RLF Occurs in the Source MCG.

Figure 18:
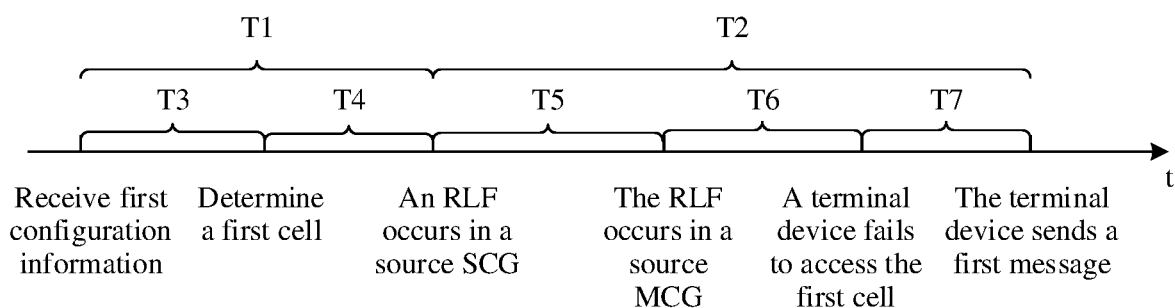
FIG. 18 is one of schematic diagrams of first time period information according to at least one embodiment.

In an implementation, in response to the terminal device failing to access the first cell, and the RLF occurring in the source MCG, as shown in FIG. 18, the first time period information includes at least one of the following:

information about a time period T1 from in response to the terminal device receiving the first configuration information to in response to the RLF occurring in the source SCG, information about a time period T3 from in response to the terminal device receiving the first configuration information to in response to the terminal device determining the first cell, information about a time period T4 from in response to the terminal device determining the first cell to in response to the RLF occurring in the source SCG, information about a time period T5 from in response to the RLF occurring in the source SCG to in response to the RLF occurring in the source MCG, information about a time period T6 from in response to the RLF occurring in the source MCG to in response to the terminal device failing to access the first cell, information about a time period T7 from in response to the terminal device failing to access the first cell to in response to the terminal device sending the first message, or information about a time period T2 from in response to the RLF occurring in the source SCG to in response to the terminal device sending the first message. For example, the first time period information is T3, T4, T5, T6, and T7. Alternatively, the first time period information is T1, T2, T3, T4, T5, T6, and T7. Alternatively, the first time period information is another variation. This is not limited.

Figure 19:
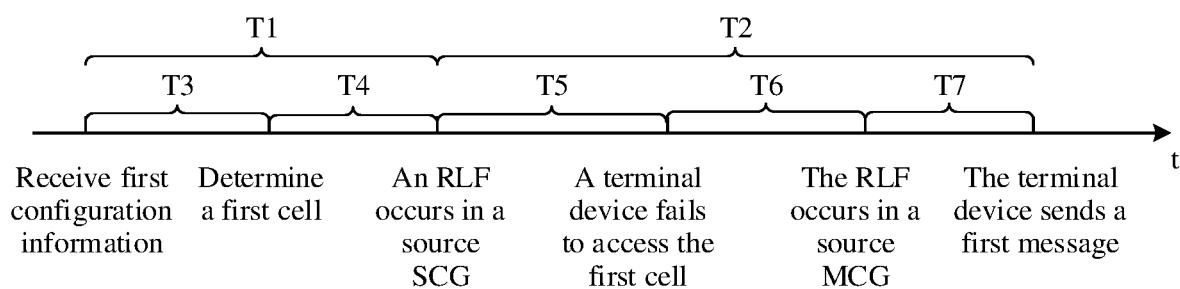
FIG. 19 is one of schematic diagrams of first time period information according to at least one embodiment.

In another embodiment, in response to the terminal device failing to access the first cell, and the RLF occurring in the source MCG, as shown in FIG. 19, the first time period information includes at least one of the following:

information about a time period T1 from in response to the terminal device receiving the first configuration information to in response to the RLF occurring in the source SCG, information about a time period T3 from in response to the terminal device receiving the first configuration information to in response to the terminal device determining the first cell, information about a time period T4 from in response to the terminal device determining the first cell to in response to the RLF occurring in the source SCG, information about a time period T5 from in response to the RLF occurring in the source SCG to in response to the terminal device failing to access the first cell, information about a time period T6 from in response to the terminal device failing to access the first cell to in response to the RLF occurring in the source MCG, information about a time period T7 from in response to the RLF occurring in the source MCG to in response to the terminal device sending the first message, or information about a time period T2 from in response to the RLF occurring in the source SCG to in response to the terminal device sending the first message. For example, the first time period information is T3, T4, T5, T6, and T7. Alternatively, the first time period information is T1, T2, T3, T4, T5, T6, and T7. Alternatively, the first time period information is another variation. This is not limited.

Figure 20:
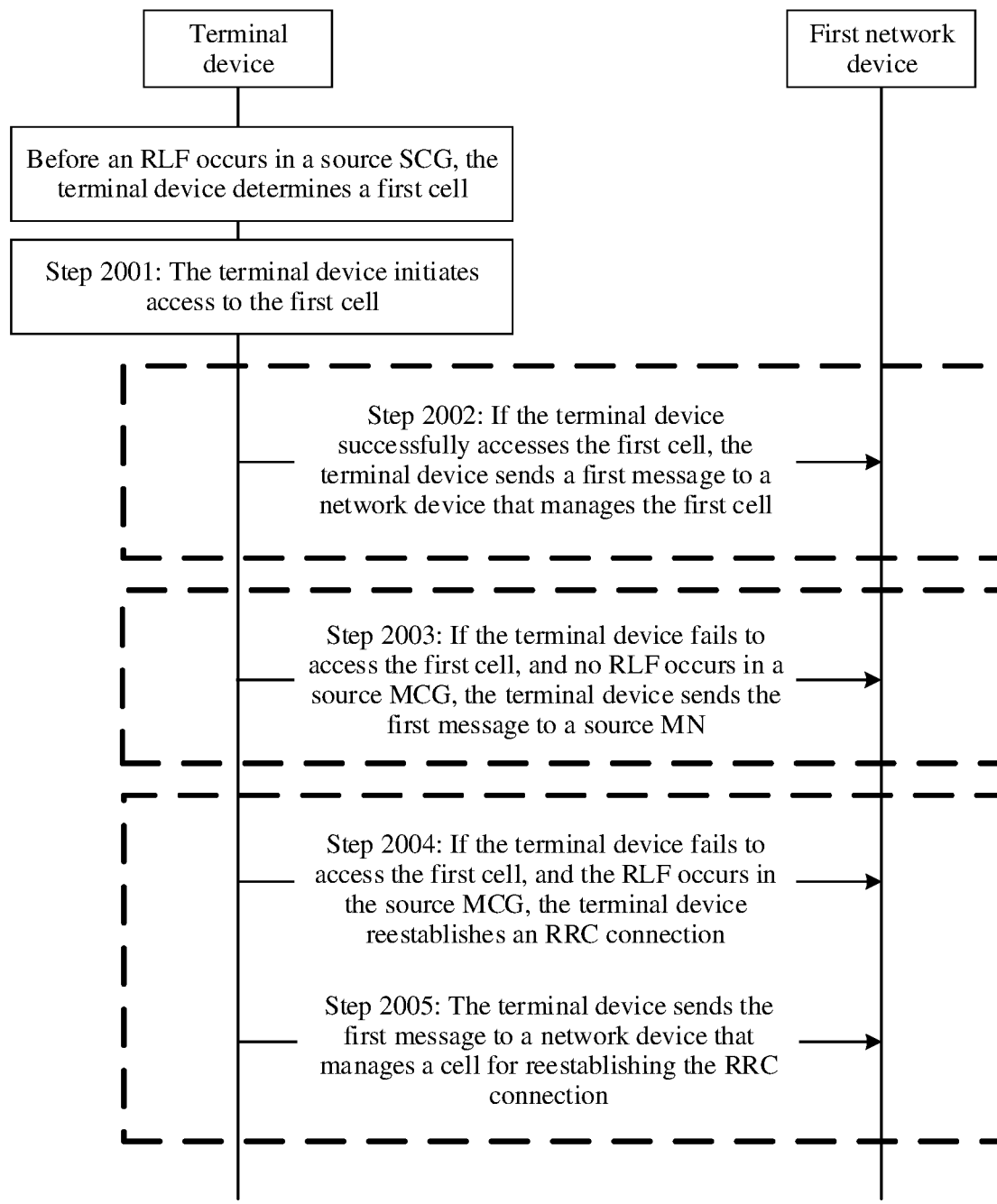
FIG. 20 is one of example flowcharts of a communication method according to at least one embodiment.

After receiving the first message from the terminal device, the first network device further sends a second message to the second network device. FIG. 20 is an example flowchart of communication between the terminal device and a network side. The following steps is included.

Step 2001: After the first cell is determined, the RLF occurs in the source SCG, and the terminal device initiates access to the first cell.

Step 2002: In response to the terminal device successfully accessing the first cell, the terminal device sends the first message to the first network device.

The first network device herein is the network device that manages the first cell, and the second network device is the source MN, or is the candidate SN. Alternatively, the terminal device sends the first message to a network device that provides communication for the terminal device, and it is not required that the terminal device only sends the first message to the network device to which the first cell belongs. The network device that manages the first cell sends the second message to the source MN. The second message includes a part or all of the first message. For example, the second message includes the first time period information as shown in FIG. 17 to FIG. 19. Optionally, after receiving the second message, the source MN changes an MCG/PSCell, and a changed-to MCG/PSCell is long to or not belong to the source MN. Optionally, in response to CPC being triggered by the source MN, the source MN adjusts time for triggering CPC. For example, the source MN sends first configuration information to the terminal device earlier. Optionally, the source MN further adjusts the first configuration information, for example, reduce an execution condition for primary secondary cell change. The network device that manages the first cell further sends the second message to a source SN or the candidate SN, or the source MN sends the second message to the source SN or the candidate SN after receiving the second message. In response to CPC being triggered by the source SN, after the source SN receives the second message, the source SN adjusts time for triggering CPC. For example, the source SN sends the first configuration information to the terminal device earlier. Optionally, the source SN further adjusts the first configuration information, for example, reduce an execution condition for primary secondary cell change. After receiving the second message, the candidate SN adjusts a CPC parameter. For example, the candidate SN adjusts information about a candidate target primary secondary cell.

Step 2003: In response to the terminal device failing to access the first cell, and no RLF occurring in the source MCG, the terminal device sends the first message to the first network device.

In this case, the first network device is the source MN, and the second network device is the source SN, or is the candidate SN. Alternatively, the terminal device sends the first message to the network device that provides communication for the terminal device, and it is not required that the terminal device only sends the first message to the source MN. The source MN sends the second message to the source SN or the candidate SN. The second message includes a part or all of the first message. For example, the second message includes the first time period information as shown in FIG. 17 to FIG. 19. Optionally, after receiving the first message, the source MN changes an MCG/PSCell, and a changed-to MCG/PSCell is long to or not belong to the source MN. Optionally, in response to CPC being triggered by the source MN, the source MN adjusts time for triggering CPC. For example, the source MN sends first configuration information to the terminal device earlier. Optionally, the source MN further adjusts the first configuration information, for example, reduce an execution condition for primary secondary cell change. The source MN further sends the second message to the source SN or the candidate SN, or the source SN sends the second message to the candidate SN after receiving the second message. Optionally, after the source SN receives the second message, in response to CPC being triggered by the source SN, the source SN adjusts time for triggering CPC. For example, the source SN sends the first configuration information to the terminal device earlier. Optionally, the source SN further adjusts the first configuration information, for example, reduce an execution condition for primary secondary cell change. Optionally, after receiving the second message, the candidate SN adjusts a CPC parameter. For example, the candidate SN adjusts the information about the candidate target primary secondary cell.

Optionally, after receiving the second message, the candidate SN sends a third message to the source MN or the source SN, where the third message includes a part or all of the second message. Optionally, the third message includes second information, and the second information indicates that the delayed CPC occurs.

Step 2004: In response to the terminal device failing to access the first cell, and the RLF occurring in the source MCG, the terminal device reestablishes an RRC connection.

Step 2005: The terminal device sends the first message to the first network device.

The first network device is a network device that manages a cell A, and the second network device is the source MN or the candidate SN. The cell A herein is a cell accessed by the terminal device in response to the terminal device re-establishing the RRC connection, and is different from the first cell. Alternatively, the terminal device sends the first message to the network device that provides communication for the terminal device, and it is not required that the terminal device only sends the first message to the network device to which the cell A belongs. The network device that manages the cell A sends the second message to the source MN, the source SN, or the candidate SN. The second message herein includes a part or all of the first message. For example, the second message includes the first time period information as shown in FIG. 17 to FIG. 19. Alternatively, the network device that manages the cell A sends the second message to the source MN, and the source MN sends the second message to the source SN or the candidate SN after receiving the second message. Optionally, after receiving the second message, the source MN changes an MCG/PSCell, and a changed-to MCG/PSCell is long to or not belong to the source MN. Optionally, in response to CPC being triggered by the source MN, the source MN adjusts time for triggering CPC. For example, the source MN sends first configuration information to the terminal device earlier. Optionally, the source MN further adjusts the first configuration information, for example, reduce an execution condition for primary secondary cell change. Optionally, after the source SN receives the second message, in response to CPC being triggered by the source SN, the source SN adjusts time for triggering CPC. For example, the source SN sends the first configuration information to the terminal device earlier. Optionally, the source SN further adjusts the first configuration information, for example, reduce an execution condition for primary secondary cell change. Optionally, after receiving the second message, the candidate SN adjusts a CPC parameter. For example, the candidate SN adjusts the information about the candidate target primary secondary cell.

Optionally, after receiving the second message, the candidate SN sends a third message to the source MN or the source SN, where the third message includes a part or all of the second message. Optionally, the third message includes second information, and the second information indicates that the delayed CPC occurs.

Figure 21:
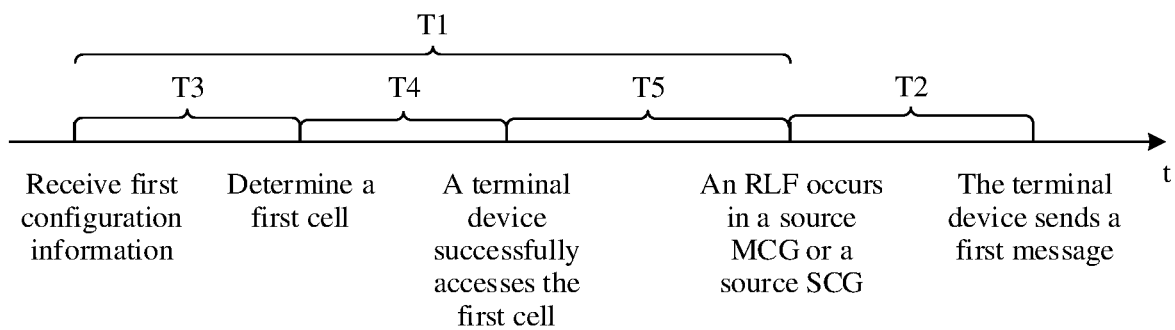
FIG. 21 is one of schematic diagrams of first time period information according to at least one embodiment.

Example 4: After the Terminal Device Successfully Accesses the First Cell, the RLF Occurs in the Source MCG or the Source SCG In response to the RLF occurring in the source MCG or the source SCG after the terminal device successfully accesses the first cell, as shown in FIG. 21, the first time period information further includes at least one of the following:
information about a time period T3 from in response to the terminal device receiving the first configuration information to in response to the terminal device determining the first cell, information about a time period T4 from in response to the terminal device determining the first cell to in response to the terminal device successfully accessing the first cell, information about a time period T5 from in response to the terminal device successfully accessing the first cell to in response to the RLF occurring in the source MCG or the source SCG, information about a time period T1 from in response to the terminal device receiving the first configuration information to in response to the RLF occurring in the source MCG or the source SCG, or information about a time period T2 from in response to the RLF occurring in the source MCG or the source SCG to in response to the terminal device sending the first message. For example, the first time period information includes T3, T4, and T5. Alternatively, the first time period information includes T1 T2, T3, T4, and T5. Alternatively, the first time period information is another variation. This is not limited.

Figure 22:
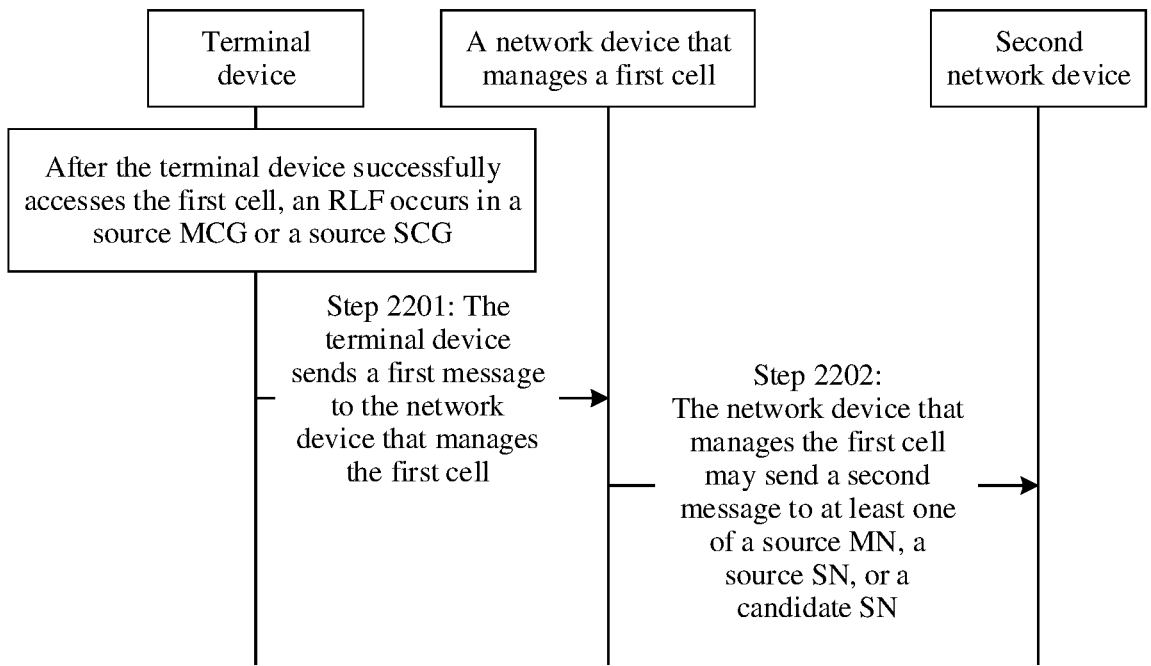
FIG. 22 is one of example flowcharts of a communication method according to at least one embodiment.

After receiving the first message, the first network device further sends a second message to a second network device. FIG. 22 is an example flowchart of communication between the terminal device and a network side. The following steps is included.

Step 2201: The terminal device sends the first message to the first network device.

The first network device herein is the network device that manages the first cell. Alternatively, the terminal device sends the first message to a network device that provides communication for the terminal device, and it is not required that the terminal device only sends the first message to a network device to which the first cell belongs. The first message includes the first time period information as shown in FIG. 21.

Step 2202: The first network device sends the second message to the second network device.

The second network device herein is at least one of a source MN, a source SN, or a candidate SN.

In an implementation, in response to the RLF occurring in the source MCG after the first cell is accessed, the network device that manages the first cell sends the second message to the source MN. In response to the RLF occurring in the source SCG after the first cell is accessed, the network device that manages the first cell sends the second message to the source SN. Optionally, the network device that manages the first cell further sends the second message to the source SN or the candidate SN. Alternatively, the source MN sends the second message to the source SN. Alternatively, the source MN or the source SN sends the second message to the candidate SN. Optionally, after receiving the second message, the source MN changes an MCG/PSCell, and a changed-to MCG/PSCell is long to or not belong to the source MN. Optionally, in response to CPC being triggered by the source MN, the source MN adjusts time for triggering CPC. For example, the source MN sends first configuration information to the terminal device earlier. Optionally, the source MN further adjusts the first configuration information, for example, reduce an execution condition for primary secondary cell change. Optionally, after the source SN receives the second message, in response to CPC being triggered by the source SN, the source SN adjusts time for triggering CPC. For example, the source SN sends the first configuration information to the terminal device earlier. Optionally, the source SN further adjusts the first configuration information, for example, reduce an execution condition for primary secondary cell change. Optionally, after receiving the second message, the candidate SN adjusts a CPC parameter. For example, the candidate SN adjusts the information about the candidate target primary secondary cell.

Alternatively, optionally, after receiving the second message, the candidate SN sends a third message to the source MN or the source SN, where the third message includes a part or all of the second message. Optionally, the third message includes second information, and the second information indicates that delayed CPC occurs.

The second message herein includes a part or all of the first message. For example, the second message includes the first time period information as shown in FIG. 21.

As described in Example 1 to Example 4, the terminal device sends the first message to the first network device. The first message includes first time period information. In an implementation, the terminal device further sends first indication information to the first network device. The first indication information indicates that the RLF occurs in the source MCG or the RLF occurs in the source SCG. For example, the terminal device separately sends the first message and the first indication information. Alternatively, the terminal device carries the first indication information in the first message and perform sending.

In response to the RLF occurring in the source MCG, the first indication information indicates that the RLF occurs in the source MCG. Alternatively, in response to the RLF occurring in the source SCG, the first indication information indicates that the RLF occurs in the source SCG.

In an example, the first message further includes cell information of the source MCG. The source MCG includes a source PCell, and optionally, further includes a source SCell that belongs to the source MN. The cell information of the source MCG includes identification information of the source MCG, for example, at least one of a PCI of the source MCG, a frequency of the source MCG, or a CGI of the source MCG. Alternatively, the cell information of the source MCG further includes signal quality of the cell. For example, the cell information of the source MCG includes cell signal quality of the source MCG of the terminal device in response to the RLF occurring in the source SCG, cell signal quality of the source MCG of the terminal device in response to the RLF occurring in the source MCG, cell signal quality of the source MCG in response to the terminal device sending the first message, or cell signal quality of the source MCG in response to the terminal device determining the first cell. Alternatively, the cell information of the source MCG includes cell signal quality of the source MCG in response to the terminal device successfully accessing the first cell. Alternatively, the cell information of the source MCG includes cell signal quality of the source MCG in response to the terminal device failing to access the first cell.

In another example, the first message alternatively includes cell information of the source SCG. The source SCG includes the source PSCell, and optionally, further includes a source SCell that belongs to the source SN. The cell information of the source SCG includes identification information of the source SCG, for example, at least one of a PCI of the source SCG, a frequency of the source SCG, or a CGI of the source SCG. Alternatively, the cell information of the source SCG further includes cell signal quality. For example, the cell information of the source SCG includes cell signal quality of the source SCG of the terminal device in response to the RLF occurring in the source MCG, or cell signal quality of the source SCG of the terminal device in response to the RLF occurring in the source SCG. Alternatively, the cell information of the source SCG includes cell signal quality of the source SCG in response to the terminal device sending the first message. The cell information of the source SCG alternatively includes cell signal quality of the source SCG in response to the terminal device determining the first cell. Alternatively, the cell information of the source SCG includes cell signal quality of the source SCG in response to the terminal device successfully accessing the first cell. Alternatively, the cell information of the source SCG includes cell signal quality of the source SCG in response to the terminal device failing to access the first cell.

In still another example, the first message alternatively includes cell information about at least one candidate target primary secondary cell. The cell information of the at least one candidate target cell herein includes cell information of the first cell, or includes cell information of another candidate target primary secondary cell other than the first cell. For example, the cell information of the at least one candidate target cell includes identification information about the at least one candidate target primary secondary cell, for example, at least one of a PCI, a frequency, or a CGI. Alternatively, the cell information of the at least one candidate target cell includes cell signal quality of the at least one candidate target primary secondary cell, for example, cell signal quality of the at least one candidate target primary secondary cell of the terminal device in response to the RLF occurring in the source MCG or in response to the RLF occurring in the source SCG. Alternatively, the cell information of the at least one candidate target cell includes cell signal quality of the at least one candidate target primary secondary cell in response to the terminal device sending the first message. Alternatively, the cell information of the at least one candidate target cell includes cell signal quality of the at least one candidate target primary secondary cell in response to the terminal device determining the first cell. Alternatively, the cell information of the at least one candidate target cell includes cell signal quality of the at least one candidate target primary secondary cell in response to the terminal device successfully accessing the first cell. Alternatively, the cell information of the at least one candidate target cell includes cell signal quality of the at least one candidate target primary secondary cell in response to the terminal device failing to access the first cell.

It should be understood that the second message includes a part or all of the first message. Therefore, the second message also includes at least one of the first information, the cell information of the source MCG, the cell information of the source SCG, or the cell information about the at least one candidate target primary secondary cell. In an example, the second message includes the first information and the cell information of the source MCG. Alternatively, the second message includes the first information and the cell information of the source SCG. Alternatively, the second message includes the first information and the cell information about the at least one candidate target primary secondary cell. Alternatively, the second message includes the first information, the cell information of the source MCG, the cell information of the source SCG, and the cell information about the at least one candidate target primary secondary cell. Alternatively, the second message includes other information. This is not limited in the present invention.

Based on the foregoing solution, with the cell information of the source MCG, the cell information of the source SCG, and the cell information about the at least one candidate target primary secondary cell that are included in the second message, the network device is enabled to determine, based on the foregoing information, a cause of a primary secondary cell change failure, and network devices also exchanges proper and valid information, so that configuration information of the primary secondary cell change is correspondingly optimized, thereby improving a success rate of the primary secondary cell change.

The communication method in at least one embodiment is described above, and a communication device in at least one embodiment is described below. The method and the device are based on a same technical concept. The method and the device have similar problem-resolving principles. Therefore, for implementations of the device and the method, reference is made to each other, and details of repeated parts are not described again.

Figure 23:
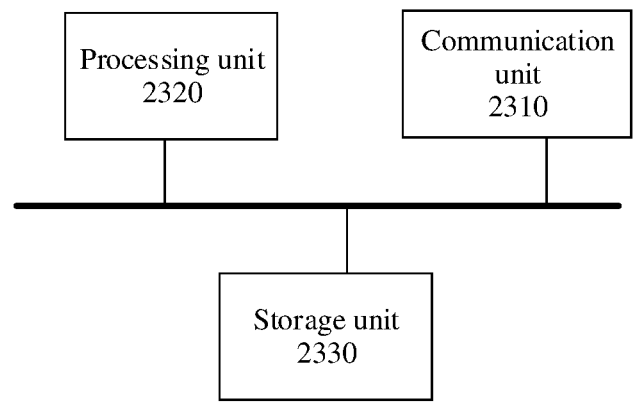
FIG. 23 is one of schematic diagrams of a terminal device according to at least one embodiment.

Based on a same technical concept as the foregoing communication method, as shown in FIG. 23, a terminal device 2300 is provided. The terminal device 2300 performs steps performed by the terminal device in the foregoing method. To avoid repetition, details are not described herein again. The terminal device 2300 includes a communication unit 2310 and a storage unit 2330. Optionally, the terminal device 2300 further includes a processing unit 2320. The processing unit 2320 is separately connected to the storage unit 2330 and the communication unit 2310, and the storage unit 2330 is also connected to the communication unit 2310. The processing unit 2320 is integrated with the storage unit 2330.

The storage unit 2330 is configured to store a computer program.

For example, the communication unit 2310 is configured to receive first configuration information by using a communication unit, where the first configuration information includes information about at least one candidate target primary secondary cell and corresponding information about an execution condition for primary secondary cell change, the first configuration information is used to determine a first cell, and the first cell is a cell that meets the execution condition for primary secondary cell change in the at least one candidate target primary secondary cell. The communication unit 2310 further sends a first message in response to a radio link failure RLF occurring in a source master cell group MCG or a source secondary cell group SCG of the terminal device, where the first message includes first time period information. For related descriptions of the first time period information, refer to related descriptions of the method embodiment shown in FIG. 2.

An embodiment of at least one embodiment further provides a communication apparatus. The communication apparatus is a terminal device, or is a circuit. The communication apparatus is configured to perform an action performed by the terminal device in the foregoing method embodiment.

The steps performed by the terminal device in the foregoing method is also implemented by a chip used in the terminal device. The communication unit is an input/output circuit or an interface of the chip. The processing unit is a logic circuit. The logic circuit processes to-be-processed data based on the steps described in the foregoing method aspects, to obtain processed data. The to-be-processed data is data, for example, the first configuration information, received by the input circuit/interface. The processed data is data, for example, the first message, obtained based on the to-be-processed data. The output circuit/interface is configured to output the processed data.

Figure 24:
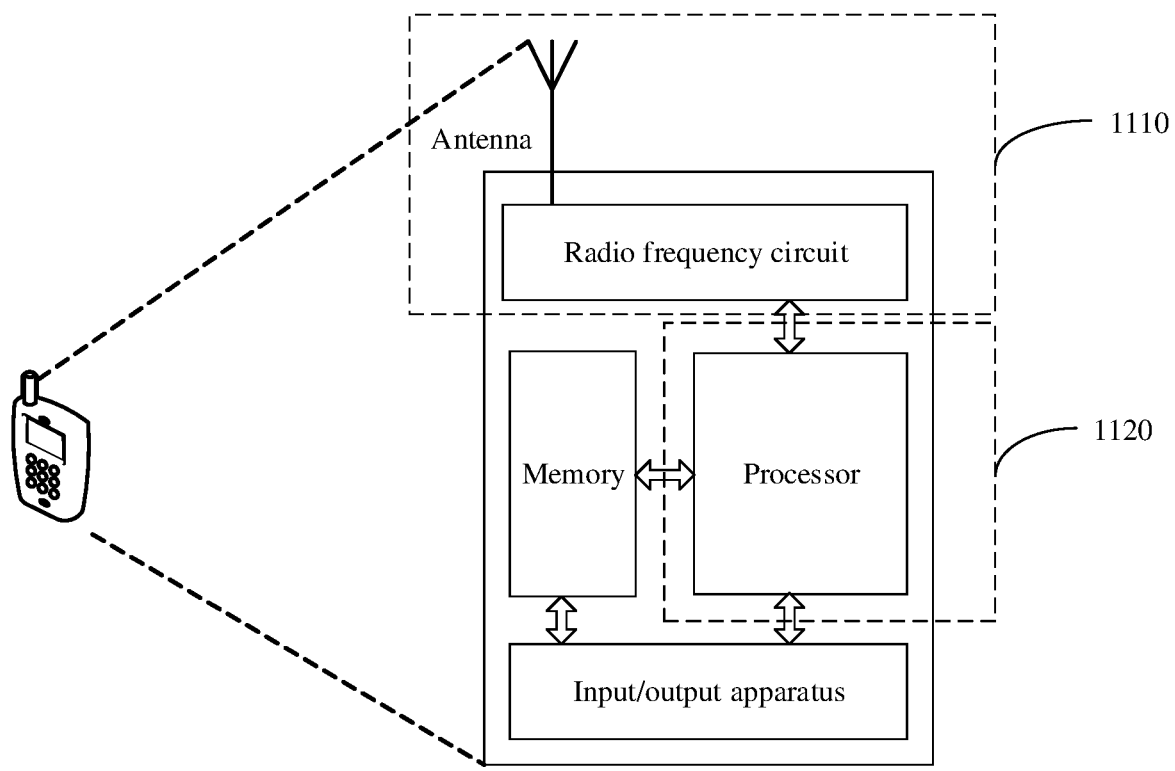
FIG. 24 is one of schematic diagrams of a terminal device according to at least one embodiment.

FIG. 24 is a simplified schematic diagram of a structure of a terminal device. For ease of understanding and illustration, an example in which the terminal device is a mobile phone is used in FIG. 24. As shown in FIG. 24, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices have no input/output apparatus.

In response to needing to sending data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. In response to data being sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, only one memory and one processor are shown in FIG. 24. In an actual terminal device product, there is one or more processors and one or more memories. The memory is also referred to as a storage medium, a storage device, or the like. The memory is disposed independent of the processor, or is integrated with the processor. This is not limited in at least one embodiment.

In at least one embodiment, an antenna and a radio frequency circuit that have sending and receiving functions is considered as a communication unit of the terminal device, and a processor that has a processing function is considered as a processing unit of the terminal device. As shown in FIG. 24, the terminal device includes a communication unit 2410 and a processing unit 2420. The communication unit is also referred to as a transceiver, a transceiver machine, a transceiver apparatus, or the like. The processing unit is also referred to as a processor, a processing board, a processing module, a processing apparatus, or the like. Optionally, a component for implementing a receiving function in the communication unit 2410 is considered as a receiving unit, and a component for implementing a sending function in the communication unit 2410 is considered as a sending unit. In other words, the communication unit 2410 includes the receiving unit and the sending unit. The communication unit sometimes is also referred to as a transceiver machine, a transceiver, a transceiver circuit, or the like. The receiving unit sometimes is also referred to as a receiver machine, a receiver, a receive circuit, or the like. The sending unit sometimes is also referred to as a transmitter machine, a transmitter, a transmit circuit, or the like.

It should be understood that the communication unit 2410 is configured to perform a sending operation and a receiving operation on a terminal device side in the foregoing method embodiments, and the processing unit 2420 is configured to perform an operation other than the receiving operation and the sending operation on the terminal device in the foregoing method embodiments.

For example, in an implementation, the communication unit 2410 is configured to perform the receiving operation and/or the sending operation on the terminal device side in Step 201 and Step 202 in FIG. 2, and/or the communication unit 2410 is further configured to perform another sending and receiving step on the terminal device side in at least one embodiment. The processing unit 2420 is configured to perform another processing step on the terminal device side in at least one embodiment.

Figure 25:
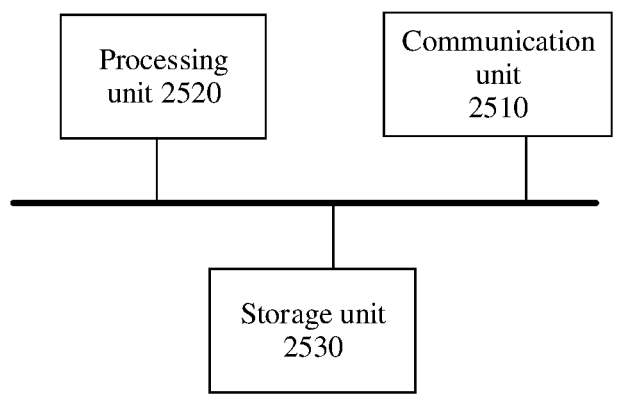
FIG. 25 is one of schematic diagrams of a network device according to at least one embodiment.

Based on a same technical concept as the foregoing communication method, as shown in FIG. 25, a network device 2500 is provided. The network device 2500 performs steps performed by the first network device and the second network device in the foregoing method. To avoid repetition, details are not described herein again. The network device 2500 includes a communication unit 2510 and a storage unit 2530. Optionally, the network device 2500 further includes a processing unit 2520. The processing unit 2520 is separately connected to the storage unit 2530 and the communication unit 2510, and the storage unit 2530 is also connected to the communication unit 2510. The processing unit 2520 is integrated with the storage unit 2530.

The storage unit 2530 is configured to store a computer program.

For example, the communication unit 2510 is configured to receive a first message sent by a terminal device. For descriptions of the first message, refer to related descriptions of the method embodiment shown in FIG. 2. Details are not described herein again. The communication unit 2510 is further configured to send a second message to the second network device. For related descriptions of the second message, refer to related descriptions of the method embodiment shown in FIG. 2.

For example, the communication unit 2510 is further configured to receive a second message sent by the first network device, and send a third message to a third network device. Descriptions of the third message is the same as related descriptions in the method embodiment shown in FIG. 2.

The steps performed by the first network device or the second network device in the foregoing method is also implemented by a chip used in the network device. The communication unit is an input/output circuit or an interface of the chip. The processing unit is a logic circuit. The logic circuit processes to-be-processed data based on the steps described in the foregoing method aspects, to obtain processed data. The to-be-processed data is data, for example, the first message, received by the input circuit/interface. The processed data is data, for example, the second message, obtained based on the to-be-processed data. The output circuit/interface is configured to output the processed data.

Figure 26:
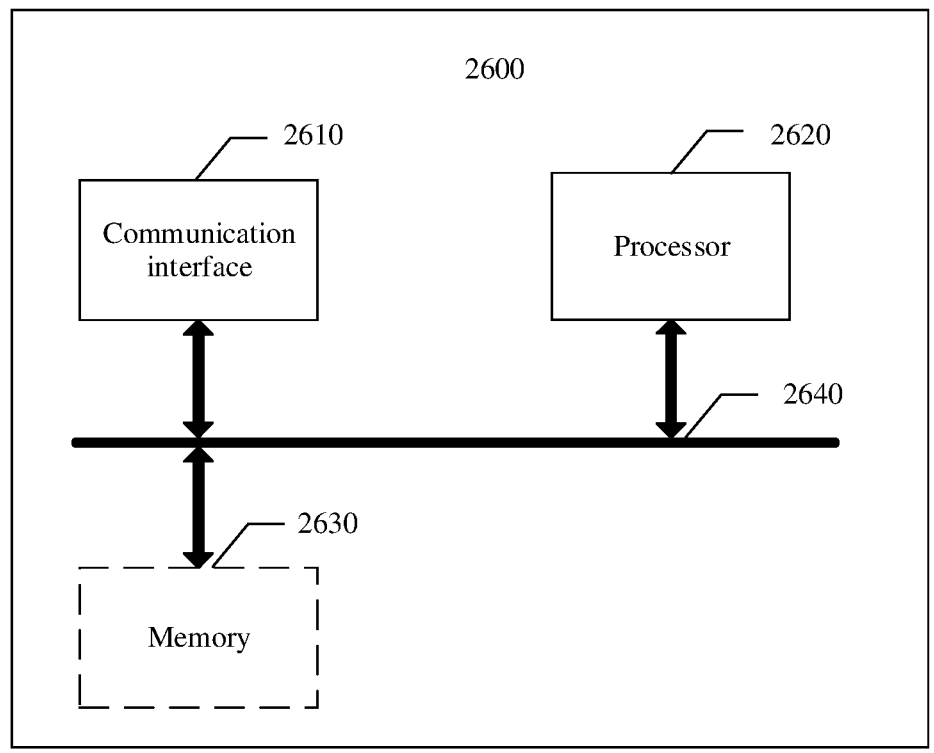
FIG. 26 is a block diagram of a communication apparatus according to at least one embodiment.

FIG. 26 shows a communication apparatus 2600 according to at least one embodiment. The communication apparatus 2600 is configured to implement functions of the terminal device and the network device in the foregoing method. The communication apparatus is a terminal device or a network device, is a chip used for a terminal device or a network device, or is an apparatus that is used with a terminal device or a network device.

The communication apparatus 2600 includes at least one processor 2620, configured to implement functions of the terminal device and the network device in the method provided in at least one embodiment. The communication apparatus 2600 further includes a communication interface 2610. In at least one embodiment, the communication interface is a transceiver, a circuit, a bus, a module, or a communication interface of another type, and is configured to communicate with another device by using a transmission medium. For example, the communication interface 2610 is used by an apparatus in the communication apparatus 2600 to communicate with another device. In response to the communication apparatus 2600 being a terminal device, the processor 2620 completes a function of the processing unit 2320 shown in FIG. 23, and the communication interface 2610 completes a function of the communication unit 2310 shown in FIG. 23. In response to the communication apparatus 2600 being a network device, the processor 2620 completes a function of the processing unit 2520 shown in FIG. 25, and the communication interface 2610 completes a function of the communication unit 2510 shown in FIG. 25.

The communication apparatus 2600 further includes at least one memory 2630, configured to store program instructions and/or data. The memory 2630 is coupled to the processor 2620. The coupling in at least one embodiment is an indirect coupling or a communication connection between apparatuses, units, or modules in an electrical form, a mechanical form, or another form, and is used for information exchange between the apparatuses, the units, or the modules. The processor 2620 cooperates with the memory 2630. The processor 2620 executes the program instructions stored in the memory 2630. At least one of the at least one memory is included in the processor.

In at least one embodiment, a specific connection medium among the communication interface 2610, the processor 2620, and the memory 2630 is not limited. In at least one embodiment, the memory 2630, the processor 2620, and the communication interface 2610 are connected with each other by using a bus 2640 in FIG. 26. The bus is represented by using a thick line in FIG. 26. A connection manner between other components is merely an example for description, and is not limited thereto. The bus is classified into an address bus, a data bus, a control bus, and the like. For ease of expression, the bus is indicated by only a bold line in FIG. 26, which does not mean that only one bus or one type of bus exists.

In another form of this embodiment, a computer-readable storage medium is provided. The computer-readable storage medium stores instructions, and in response to the instructions being executed, the method on a terminal device side, a first network device side, or a second network device side in the foregoing method embodiments is performed.

In another form of this embodiment, a computer program product including instructions is provided. In response to the instructions being executed, the method on a terminal device side, a first network device side, or a second network device side in the foregoing method embodiments is performed.

In another form of this embodiment, a communication system is provided, and the system includes the at least one terminal device and the at least one network device.

It should be understood that the processor mentioned in embodiments of the present invention is a central processing unit (Central Processing Unit, CPU), or is another general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, a discrete hardware component, or the like. The general-purpose processor is a microprocessor, or the processor is any conventional processor or the like.

It is understood that the memory mentioned in embodiments of the present invention is a volatile memory or a nonvolatile memory, or includes a volatile memory and a nonvolatile memory. The nonvolatile memory is a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory is a random access memory (Random Access Memory, RAM), used as an external cache. Through example but not limitative descriptions, many forms of RAMs is used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that in response to the processor being a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments described herein. The execution sequences of the processes should be determined according to functions and internal logic of the processes, and should not be construed as any limitation on the implementation processes of embodiments of the present invention.

A person of ordinary skill in the art is aware that, in combination with the examples described in embodiments disclosed in this specification, units and algorithm steps is implemented by electronic hardware or a combination of computer software and electronic hardware. Whether the functions are performed by hardware or software depends on particular applications and design constraint conditions of the technical solutions. A person skilled in the art uses different methods to implement the described functions for each particular embodiment, but it should not be considered that the implementation goes beyond the scope of embodiments described herein.

A person skilled in the art understands that, for the purpose of convenient and brief description, for a detailed working process of the foregoing system, apparatus, and unit, refer to a corresponding process in the foregoing method embodiments. Details are not described herein again.

In the several embodiments provided in at least one embodiment, it should be understood that the disclosed system, apparatus, and method is implemented in other manners. For example, the described apparatus embodiment is merely an example. For example, division into the units is merely logical function division and is other division in actual implementation. For example, a plurality of units or components is combined or integrated into another system, or some features is ignored or not performed. In addition, the displayed or discussed mutual couplings or direct couplings or communication connections is implemented by using some interfaces. The indirect couplings or communication connections between the apparatuses or units is implemented in electronic, mechanical, or other forms.

The units described as separate parts may or may not be physically separate, and parts displayed as units may or may not be physical units, is located in one position, or is distributed on a plurality of network units. Some or all of the units is selected based on an actual requirement to achieve an objective of the solutions of embodiments.

In addition, functional units in at least one embodiment is integrated into one processing unit, or each of the units exist alone physically, or two or more units is integrated into one unit.

In response to the functions being implemented in the form of a software functional unit and sold or used as an independent product, the functions is stored in a computer-readable storage medium. Based on such an understanding, the technical solutions of embodiments described herein essentially, or the part contributing to the current technology, or some of the technical solutions is implemented in a form of a software product. A computer software product is stored in a storage medium, and includes several instructions for instructing a computer device (which is a personal computer, a server, or a network device) to perform all or some of the steps of the methods described in at least one embodiment. The foregoing storage medium includes any medium that stores program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of at least one embodiment, but are not intended to limit the protection scope of at least one embodiment. Any variation or replacement readily figured out by a person skilled in the art within the technical scope disclosed in at least one embodiment shall fall within the protection scope of at least one embodiment. Therefore, the protection scope of at least one embodiment shall be subject to the protection scope of the claims.

What is claimed is:

1. A communication method applied to a terminal device, the method comprising:
receiving first configuration information, wherein the first configuration information includes information about at least one candidate target primary secondary cell and corresponding information about an execution condition for primary secondary cell change, the first configuration information is used to determine a first cell, and the first cell is a cell that meets the execution condition for primary secondary cell change in the at least one candidate target primary secondary cell;
sending a first message in response to a radio link failure (RLF) occurring in a source master cell group (MCG) or a source secondary cell group (SCG) of the terminal device, wherein the first message includes first time period information; and
the first time period information comprises includes at least one of the following:
information about a time period from in response to receiving the first configuration information to in response to the RLF occurring in the source MCG or the source SCG, or information about a time period from in response to the RLF occurring in the source MCG or the source SCG to in response to sending the first message.

2. The method according to claim 1, wherein the sending a first message includes:
sending the first message in response to the RLF occurring in the source MCG or the source SCG and the first cell does not exist.

3. The method according to claim 1, wherein the method further comprises:
after the RLF occurs in the source SCG, determining the first cell based on the first configuration information, and initiating access to the first cell, wherein based on successfully accessing the first cell, the first time period information further includes at least one of the following:

information about a time period from in response to the RLF occurring in the source SCG to in response to determining the first cell, information about a time period from in response to determining the first cell to in response to the terminal device successfully accessing the first cell, or information about a time period from in response to the terminal device successfully accessing the first cell to in response to sending the first message;

based on failing to access the first cell, and no RLF occurring in the source MCG, the first time period information further includes at least one of the following:

information about a time period from in response to the RLF occurring in the source SCG to in response to the terminal device determining the first cell, information about a time period from in response to the terminal device determining the first cell to in response to the terminal device failing to access the first cell, or information about a time period from in response to the terminal device failing to access the first cell to in response to the terminal device sending the first message;

based on failing to access the first cell, and the RLF occurring in the source MCG, the first time period information includes at least one of the following: information about a time period from in response to the RLF occurring in the source SCG to in response to the terminal device determining the first cell, information about a time period from in response to the terminal device determining determines the first cell to in response to the RLF occurring in the source MCG, information about a time period from in response to the RLF occurring in the source MCG to in response to the terminal device failing to access the first cell, or information about a time period from in response to the terminal device failing to access the first cell to in response to the terminal device sending the first message; or based on failing to access the first cell, and the RLF occurring in the source MCG, the first time period information further includes at least one of the following:

information about a time period from in response to the RLF occurring in the source SCG to in response to the terminal device determining the first cell, information about a time period from in response to the terminal device determining the first cell to in response to the terminal device failing to access the first cell, information about a time period from in response to the terminal device failing to access the first cell to in response to the RLF occurring in the source MCG, or information about a time period from in response to the RLF occurring in the source MCG to in response to the terminal device sending the first message.

4. The method according to claim 1, wherein
before the RLF occurs in the source MCG or the source SCG, based on the first cell is determined, the first time period information further includes at least one of the following:

information about a time period from in response to the terminal device receiving the first configuration information to in response to the terminal device determining the first cell; or information about a time period from in response to the terminal device determining the first cell to in response to the RLF occurring in the source MCG or the source SCG.

5. The method according to claim 4, wherein
based on successfully accessing the first cell, the first time period information further includes at least one of the following:

information about a time period from in response to the RLF occurring in the source MCG or the source SCG to in response to the terminal device accessing the first cell, or information about a time period from in response to the terminal device accesses the first cell to in response to the terminal device sending the first message.

6. The method according to claim 4, wherein before the RLF occurs in the source MCG, the first cell is determined, and based on failing to access the first cell, and no RLF occurring in the source SCG, the first time period information further includes at least one of the following:

information about a time period from in response to the RLF occurring in the source MCG to in response to the terminal device failing to access the first cell, or information about a time period from in response to the terminal device failing to access the first cell to in response to the terminal device sending the first message;

based on failing to access the first cell, and the RLF occurring in the source SCG, the first time period information includes at least one of the following: information about a time period from in response to the RLF occurring in the source MCG to in response to the RLF occurring in the source SCG, information about a time period from in response to the RLF occurring in the source SCG to in response to the terminal device failing to access the first cell, or information about a time period from in response to the terminal device failing to access the first cell to in response to the terminal device sending the first message; or based on failing to access the first cell, and the RLF occurring in the source SCG, the first time period information further includes at least one of the following: information about a time period from in response to the RLF occurring in the source MCG to in response to the terminal device failing to access the first cell, information about a time period from in response to the terminal device failing to access the first cell to in response to the RLF occurring in the source SCG, or information about a time period from in response to the RLF occurring in the source SCG to in response to the terminal device sending the first message.

7. The method according to claim 4, wherein before the RLF occurs in the source SCG, the first cell is determined, and based on failing to access the first cell, and no RLF occurring in the source MCG, the first time period information further includes at least one of the following: information about a time period from in response to the RLF occurring in the source SCG to in response to the terminal device failing to access the first cell, or information about a time period from in response to the terminal device failing to access the first cell to in response to the terminal device sending the first message;

based on failing to access the first cell, and the RLF occurring in the source MCG, the first time period information further includes at least one of the following: information about a time period from in response to the RLF occurring in the source SCG to in response to the RLF occurring in the source MCG, information about a time period from in response to the RLF occurring in the source MCG to in response to the terminal device failing to access the first cell, or information about a time period from in response to the terminal device failing to access the first cell to in response to the terminal device sending the first message; or based on failing to access the first cell, and the RLF occurring in the source MCG, the first time period information further includes at least one of the following: information about a time period from in response to the RLF occurring in the source SCG to in response to the terminal device failing to access the first cell, information about a time period from in response to the terminal device failing to access the first cell to in response to the RLF occurring in the source MCG, or information about a time period from in response to the RLF occurring in the source MCG to in response to the terminal device sending the first message.

8. The method according to claim 1, wherein after successfully accessing the first cell, in response to the RLF occurring in the source MCG or the source SCG, the first time period information further includes at least one of the following:

information about a time period from in response to the terminal device receiving the first configuration information to in response to the terminal device determining the first cell, information about a time period from in response to the terminal device determining the first cell to in response to the terminal device successfully accessing the first cell, or information about a time period from in response to the terminal device successfully accessing the first cell to in response to the RLF occurring in the source MCG or the source SCG.

9. The method according to claim 1, wherein the method further comprises:

sending first indication information, wherein the first indication information indicates that the RLF occurs in the source MCG or the RLF occurs in the source SCG.

10. A communication apparatus, comprising:

at least one processor in communication with at least one memory, the at least one processor configured, upon execution of instructions stored in the at least one memory, to perform the following steps:

receiving first configuration information, wherein the first configuration information includes information about at least one candidate target primary secondary cell and corresponding information about an execution condition for primary secondary cell change, the first configuration information is used to determine a first cell, and the first cell is a cell that meets the execution condition for primary secondary cell change in the at least one candidate target primary secondary cell;

sending a first message in response to a radio link failure (RLF) occurring in a source master cell group (MCG) or a source secondary cell group (SCG) of the terminal device, wherein the first message includes first time period information; and the first time period information includes at least one of the following:

information about a time period from in response to receiving the first configuration information to in response to the RLF occurring in the source MCG or the source SCG, or information about a time period from in response to the RLF occurring in the source MCG or the source SCG to in response to sending the first message.

11. The communication apparatus according to claim 10, wherein the sending a first message includes:

sending the first message in response to the RLF occurring in the source MCG or the source SCG and the first cell does not exist.

12. The communication apparatus according to claim 10, wherein the instructions, in response to being executed by the at least one processor, further cause the apparatus to:

after the RLF occurs in the source SCG, determine the first cell based on the first configuration information, and initiate access to the first cell, wherein based on successfully accessing the first cell, the first time period information further includes at least one of the following:

information about a time period from in response to the RLF occurring in the source SCG to in response to determining the first cell, information about a time period from in response to determining the first cell to in response to the terminal device successfully accessing the first cell, or information about a time period from in response to the terminal device successfully accessing the first cell to in response to sending the first message;

based on failing to access the first cell, and no RLF occurring in the source MCG, the first time period information further includes at least one of the following:

information about a time period from in response to the RLF occurring in the source SCG to in response to the terminal device determining the first cell, information about a time period from in response to the terminal device determining the first cell to in response to the terminal device failing to access the first cell, or information about a time period from in response to the terminal device failing to access the first cell to in response to the terminal device sending the first message;

based on failing to access the first cell, and the RLF occurring in the source MCG, the first time period information includes at least one of the following: information about a time period from in response to the RLF occurring in the source SCG to in response to the terminal device determining the first cell, information about a time period from in response to the terminal device determining the first cell to in response to the RLF occurring in the source MCG, information about a time period from in response to the RLF occurring in the source MCG to in response to the terminal device failing to access the first cell, or information about a time period from in response to the terminal device failing to access the first cell to in response to the terminal device sending the first message; or based on failing to access the first cell, and the RLF occurring in the source MCG, the first time period information further includes at least one of the following:

information about a time period from in response to the RLF occurring in the source SCG to in response to the terminal device determining the first cell, information about a time period from in response to the terminal device determining the first cell to in response to the terminal device failing to access the first cell, information about a time period from in response to the terminal device failing to access the first cell to in response to the RLF occurring in the source MCG, or information about a time period from in response to the RLF occurring in the source MCG to in response to the terminal device sending the first message.

13. The communication apparatus according to claim 10, wherein
before the RLF occurs in the source MCG or the source SCG, based on the first cell is determined, the first time period information further includes at least one of the following:
information about a time period from in response to the terminal device receiving the first configuration information to in response to the terminal device determining the first cell; or information about a time period from in response to the terminal device determining the first cell to in response to the RLF occurring in the source MCG or the source SCG.

14. The communication apparatus according to claim 13, wherein
based on successfully accessing the first cell, the first time period information further includes at least one of the following:
information about a time period from in response to the RLF occurring in the source MCG or the source SCG to in response to the terminal device accessing the first cell, or information about a time period from in response to the terminal device accessing the first cell to in response to the terminal device sending the first message.

15. The communication apparatus according to claim 13, wherein before the RLF occurs in the source MCG, the first cell is determined, and
based on failing to access the first cell, and no RLF occurring in the source SCG, the first time period information further includes at least one of the following:
information about a time period from in response to the RLF occurring in the source MCG to in response to the terminal device failing to access the first cell, or information about a time period from in response to the terminal device failing to access the first cell to in response to the terminal device sending the first message;
based on failing to access the first cell, and the RLF occurring in the source SCG, the first time period information includes at least one of the following: information about a time period from in response to the RLF occurring in the source MCG to in response to the RLF occurring in the source SCG, information about a time period from in response to the RLF occurring in the source SCG to in response to the terminal device failing to access the first cell, or information about a time period from in response to the terminal device failing to access the first cell to in response to the terminal device sending the first message; or
based on failing to access the first cell, and the RLF occurring in the source SCG, the first time period information further includes at least one of the following: information about a time period from in response to the RLF occurring in the source MCG to in response to the terminal device failing to access the first cell, information about a time period from in response to the terminal device failing to access the first cell to in response to the RLF occurring in the source SCG, or information about a time period from in response to the RLF occurring in the source SCG to in response to the terminal device sending the first message.

16. The communication apparatus according to claim 13, wherein before the RLF occurs in the source SCG, the first cell is determined, and
based on failing to access the first cell, and no RLF occurring in the source MCG, the first time period information further includes at least one of the following: information about a time period from in response to the RLF occurring in the source SCG to in response to the terminal device failing to access the first cell, or information about a time period from in response to the terminal device failing to access the first cell to in response to the terminal device sending the first message;
based on failing to access the first cell, and the RLF occurring in the source MCG, the first time period information further includes at least one of the following: information about a time period from in response to the RLF occurring in the source SCG to in response to the RLF occurring in the source MCG, information about a time period from in response to the RLF occurring in the source MCG to in response to the terminal device failing to access the first cell, or information about a time period from in response to the terminal device failing to access the first cell to in response to the terminal device sending the first message; or
based on failing to access the first cell, and the RLF occurring in the source MCG, the first time period information further includes at least one of the following: information about a time period from in response to the RLF occurring in the source SCG to in response to the terminal device failing to access the first cell, information about a time period from in response to the terminal device failing to access the first cell to in response to the RLF occurring in the source MCG, or information about a time period from in response to the RLF occurring in the source MCG to in response to the terminal device sending the first message.

17. The communication apparatus according to claim 10, wherein after successfully accessing the first cell, in response to the RLF occurring in the source MCG or the source SCG, the first time period information further includes at least one of the following:
information about a time period from in response to the terminal device receiving the first configuration information to in response to the terminal device determining the first cell, information about a time period from in response to the terminal device determining the first cell to in response to the terminal device successfully accessing the first cell, or information about a time period from in response to the terminal device successfully accessing the first cell to in response to the RLF occurring in the source MCG or the source SCG.

18. The communication apparatus according to claim 10, the instructions, in response to being executed by the at least one processor, further cause the network device to send first indication information, wherein the first indication information indicates that the RLF occurs in the source MCG or the RLF occurs in the source SCG.

19. A communication system, comprising a first network device, and a second network device, wherein the first network device is configured to receive a first message from a terminal device, and send a second message to a second network device, wherein the second message includes a part or all of the first message, wherein the first message includes first time period information of the terminal device, and the first time period information includes at least one of the following: information about a time period from in response to the terminal device receiving first configuration information to in response to a radio link failure occurring in a source MCG or a source SCG, or information about a time period from in response to the RLF occurring in the source MCG or the source SCG to in response to the terminal device sending the first message;
the second network device is configured to receive the second message;
wherein the first network device is a network device that manages a source primary cell, and the second network device is a network device that manages a source primary secondary cell; or the first network device is a network device that manages a source primary cell, and the second network device is a network device that manages at least one candidate target primary secondary cell; or the first network device is a network device that manages a source primary secondary cell, and the second network device is a network device that manages a source primary cell; or the first network device is a network device that manages a source primary secondary cell, and the second network device is a network device that manages at least one candidate target primary secondary cell; or the first network device is a network device that provides communication for the terminal device, and the second network device is a network device that manages a source primary cell; or the first network device is a network device that provides communication for the terminal device, and the second network device is a network device that manages a source primary secondary cell; or the first network device is a network device that provides communication for the terminal device, and the second network device is a network device that manages at least one candidate target primary secondary cell.

20. The system according to claim 19, wherein the second message further includes first information indicating delayed conditional primary secondary cell change (CPC).

* * * * *